United States Patent
Pollack et al.

(10) Patent No.: US 9,853,929 B2
(45) Date of Patent: Dec. 26, 2017

(54) SERVICE COMPATIBILITY CHECK FOR MESSAGES

(71) Applicant: Apple Inc., Cupertino, CA (US)

(72) Inventors: Daniel B. Pollack, San Francisco, CA (US); Eric S. Brown, Los Altos, CA (US); Gregory B. Novick, San Francisco, CA (US); Paul W. Chinn, San Jose, CA (US); David C. Donley, Santa Clara, CA (US); Tyler D. Hawkins, San Jose, CA (US); Julien A. Poumailloux, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,075

(22) Filed: Jun. 5, 2015

(65) Prior Publication Data

US 2016/0094502 A1    Mar. 31, 2016

Related U.S. Application Data

(63) Continuation-in-part of application No. 14/640,324, filed on Mar. 6, 2015.

(60) Provisional application No. 62/057,962, filed on Sep. 30, 2014.

(51) Int. Cl.
| | |
|---|---|
| *H04L 12/58* | (2006.01) |
| *H04L 29/06* | (2006.01) |
| *H04L 12/64* | (2006.01) |
| *G06F 9/44* | (2006.01) |
| *H04W 4/12* | (2009.01) |

(52) U.S. Cl.
CPC ............... *H04L 51/12* (2013.01); *G06F 8/71* (2013.01); *H04L 12/6418* (2013.01); *H04L 63/10* (2013.01); *H04L 69/24* (2013.01); *H04W 4/12* (2013.01)

(58) Field of Classification Search
CPC ..... H04L 51/12; H04L 63/10; H04L 12/6418; H04L 69/24; G06F 8/71; H04W 4/12
USPC ......................................... 717/175; 370/259
See application file for complete search history.

(56) References Cited

U.S. PATENT DOCUMENTS

| | | | |
|---|---|---|---|
| 5,805,924 A * | 9/1998 | Stoevhase | H04L 29/06 370/254 |
| 2006/0069753 A1 | 3/2006 | Hu et al. | |
| 2007/0028001 A1 | 2/2007 | Phillips et al. | |
| 2010/0325215 A1 | 12/2010 | de Souza et al. | |

(Continued)

OTHER PUBLICATIONS

Office Action dated Apr. 19, 2017 in U.S. Appl. No. 14/640,324, 30 pages.

*Primary Examiner* — Ted T Vo
*Assistant Examiner* — Mohammed Huda
(74) *Attorney, Agent, or Firm* — Kilpatrick Townsend & Stockton LLP

(57) ABSTRACT

Systems, apparatuses, and methods are provided that can reduce problems associated with updates of various applications on various devices, including addition of new services for communicating with another device. A compatibility version (e.g., a minimum compatibility) for a first communication service on a first device can be checked against a compatibility version for communication service on a second device. A comparison of the compatibility versions can determine whether a message can be sent using the first communication service to the second device.

23 Claims, 14 Drawing Sheets

(56) References Cited

U.S. PATENT DOCUMENTS

| | | | |
|---|---|---|---|
| 2013/0229951 A1* | 9/2013 | Raleigh | G06Q 10/06375 370/259 |
| 2014/0173585 A1 | 6/2014 | Firman et al. | |
| 2014/0282468 A1 | 9/2014 | Millett et al. | |
| 2014/0325215 A1 | 10/2014 | Wright | |
| 2014/0351832 A1* | 11/2014 | Cho | H04L 67/141 719/328 |
| 2014/0373098 A1* | 12/2014 | Fausak | H04L 63/10 726/4 |
| 2015/0199197 A1 | 6/2015 | Maes et al. | |
| 2015/0254067 A1 | 9/2015 | Nigam | |
| 2015/0282244 A1* | 10/2015 | Lin | H04L 67/142 709/228 |

* cited by examiner

SERVICE COMPATIBILITY CHECK FOR MESSAGES

CROSS REFERENCE TO RELATED APPLICATIONS

The present application is a Continuation-in-Part of U.S. patent application Ser. No. 14/640,324 filed Mar. 6, 2015, entitled "Revision Locking," which claims the benefit of U.S. Provisional Application No. 62/057,962, filed Sep. 30, 2014, the disclosures of which are hereby incorporated by reference for all purposes.

BACKGROUND

Home electronics are now so popular that people often own multiple devices that they may use on a regular basis. For example, a person might own an Apple iPod Shuffle, an Apple iPhone, an Apple iPad, and an Apple MacBook Pro. These devices can be configured to communicate with each other using wired or wireless connections. Each such device can store a set of software that it can execute to perform desired functionality. Such software can include operating systems and applications, for example.

The applications, operating systems, and other software programs that are stored on a device can be versioned. As time passes, a new version of a program may become available to replace an older version of the same program. The new version might include bug fixes and/or additional or improved features that the old version did not possess. A particular program might pass through a multitude of different versions over its lifetime of usefulness. A successive version number might identify each different version. Higher version numbers are typically indicative of newer, more recent versions.

Although devices can be configured to communicate with each other, allowing programs executing on separate devices to interact with each other, programs that were once compatible with each other might later become incompatible. This can occur if one such program becomes updated to a subsequent version while another such program does not become updated to a subsequent version. The new version of the updated program might not be backwards compatible with the old version of other the program. Under such a scenario, programs might lose the ability that they once possessed to interact with each other.

If one program loses the ability to interact with another program in this manner, the results can be severe. If a particular program's functionality was largely focused on interaction with another program with which it can no longer interact, then that particular program might become relatively useless. Further, new functionality on one device might not allow communication with a device having an older operating system.

BRIEF SUMMARY

Embodiments provide systems, apparatuses, and methods that can reduce problems associated with updates of various applications on various devices, including addition of new services for communicating with another device. In some embodiments, a compatibility version (e.g., a minimum compatibility) for a first communication service on a first device can be checked against a compatibility version for a communication service on a second device. A comparison of the compatibility versions can determine whether a message can be sent using the first communication service to the second device.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
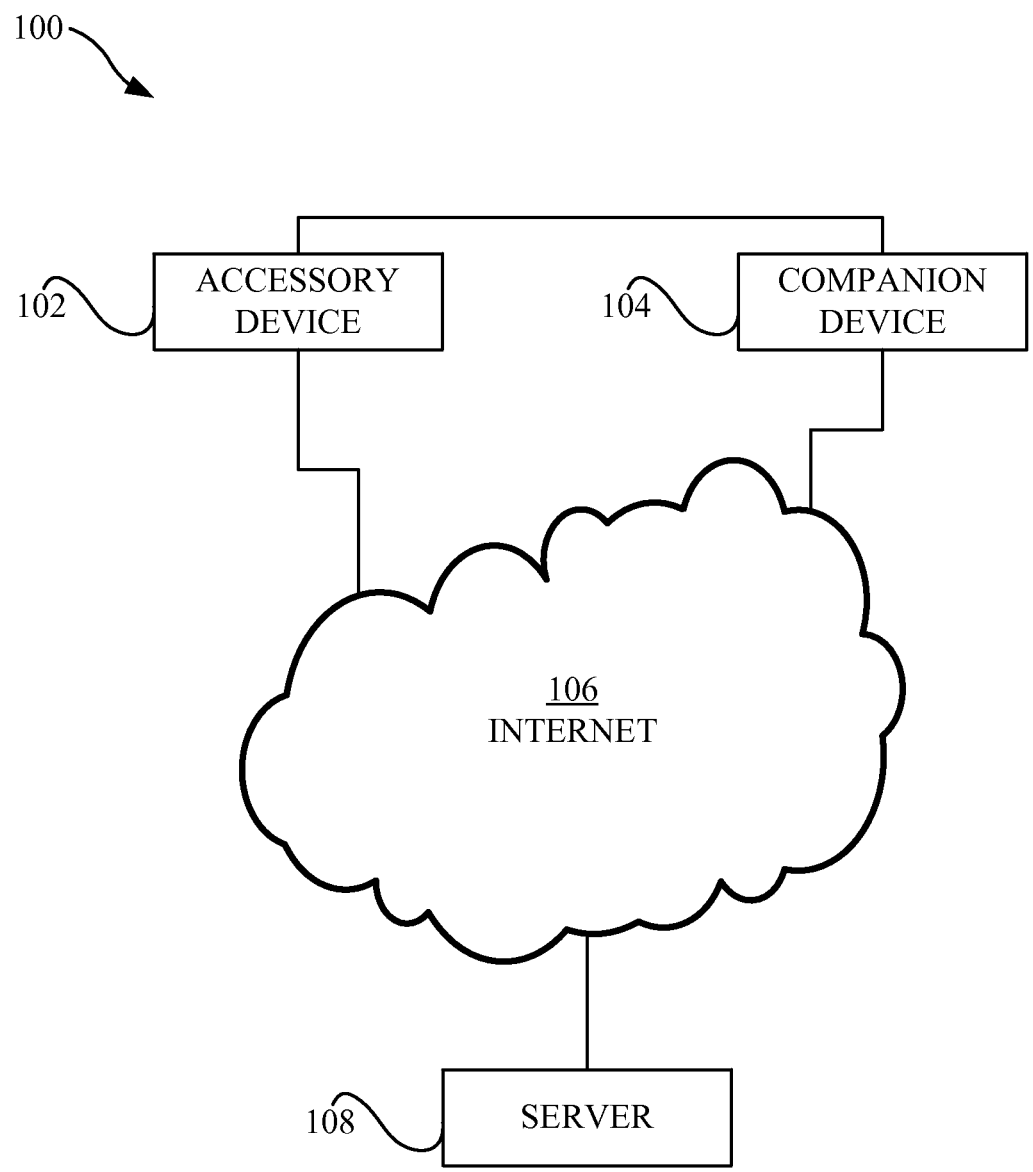
FIG. 1 is a system diagram that illustrates an example of a system in which devices interact with each other and with a server, according to some embodiments.

As is discussed in greater detail, below, some embodiments involve an interdependent software update system that includes interacting devices that can download compatibility metadata associated with program updates that those devices download from a server. The devices can use the compatibility metadata to avoid or remedy incompatibilities that might arise between versions of programs—even those stored on separate devices—due to the application of the program updates.

In some embodiments, the interacting devices periodically exchange, with each other, version identifiers for the programs that each of them store. Based on these version identifiers and lists of compatible versions specified in downloaded compatibility metadata for a program update, a device can determine whether application of the program update will cause an incompatibility between the new version of the program and current versions of other programs stored on either device. In response to determining that such an incompatibility will arise, the device can give its user the options of attempting to remedy the incompatibility prior to application, skipping the application entirely, or proceeding with the application in spite of incompatibilities that will result.

In some embodiments, compatibility classifications (e.g., a set of compatibility classifications) specified in or derived from the compatibility metadata indicate how compatible program versions are. The compatibility classifications can suggest operations that might be performed in order to remedy incompatibilities. For different compatibility classifications, a device can assume different states in which the transmission of certain types of outbound messages originating from the device's applications can be limited based on message types associated with those states. In some embodiments, message types include update-type messages (also called update message type), compatibility check-type messages, and configuration-type messages (also called configuration message type). Update-type messages are designed to assist in updating a current version of a program. Compatibility check-type messages are designed to assist in determining how compatible different program versions are. Configuration-type messages are designed to assist in remedying incompatibilities through configuration of existing program versions.

In some embodiments, a compatibility version (e.g., a minimum compatibility) for a first communication service on a first device can be checked against a compatibility version for communication service on a second device. A comparison of the compatibility versions can determine whether a message can be sent using the first communication service to the second device.

I. Interdependent Software Update System

The devices that interact with each other can include accessory and companion devices. These devices can store different programs, some of which may depend on (e.g., due to interaction with) other programs. The devices can communicate the current versions of their programs to each other. The devices can receive, from a server, program code updates that are stored by that server. These program code updates are specified in the form of items of program code update data stored at the server. Program code update data can take the form of a patch to existing program code or an installation of new program code that completely replaces existing program code.

Each item of program code update data can be associated with separate compatibility metadata that indicates which versions of other programs will be compatible with a new version of a particular program that will be produced by the application of that program code update data to an existing version of that particular program. Along with program code update data that is applicable to a program stored on a device, a server can transmit, to that device, compatibility metadata that is associated with that program code update data.

Compatibility metadata can specify separate dependent program metadata for each dependent program that depends on a particular program to which the program code update data is applicable. Each item of dependent program metadata can specify an earliest compatible version of the dependent program. Each item of dependent program metadata also can specify an earliest compatible device model on which that earliest compatible version of the dependent program can be executed.

When a device downloads, from a server, program code update data that is applicable to a program that the device stores, the downloading of that update data can include the downloading of compatibility metadata that is associated with or contained within the program code update data. Instead of applying downloaded program code update data automatically, the device can store that update data in association with the corresponding compatibility metadata. The device can use the compatibility metadata in determining whether and how to apply the corresponding program code update data to its stored programs.

A. Accessory and Companion Devices

FIG. 1 is a system diagram that illustrates an example of a system 100 in which devices interact with each other and with a server, according to some embodiments. Although an embodiment illustrated in FIG. 1 includes certain components that connect in a certain configuration, some embodiments can include additional, fewer, or different components connected in different configurations.

An accessory device 102 can connect, through wires or wirelessly, with a companion device 104. For example, accessory device 102 might be an Apple iPod Shuffle, while companion device 104 might be an Apple iPhone. In various embodiments, devices 102 and 104 can be portable music players, digital cameras, laptop computers, tablet computers, digital audio recorders, enhanced reality goggles, headphones, earpieces, or smart phones. In some cases, devices 102 and 104 can be implemented as, or placed inside or attached to a wearable accessory such as a watch, a bracelet, a necklace, a ring, a belt, a jacket, glasses, goggles, headphones, ear buds, a hearing aid, or the like. Accessory device 102 can communicate with companion device 104 using various different communication protocols. For example, accessory device 102 can communicate wirelessly with companion device 104 using a Bluetooth protocol or a WiFi protocol. For another example, accessory device 102 can communicate over a universal serial bus (USB) cable with companion device 104. Accessory device 102 and companion device 104 can send data to and receive data from each other over a connection that they directly establish with each other.

In some embodiments, devices 102 and 104 can wirelessly pair with each other using Bluetooth. In establishing such a pairing, one of devices 102 and 104 can transmit a code to the other of those devices. The device receiving the code can display the code to its user. The user can then authenticate the device that displayed the code to the device that transmitted the code by inputting that code into the device that transmitted the code. Subsequently, devices 102 and 104 are paired. Devices 102 and 104 can store each other's identities, remembering each other so that they can automatically re-establish a Bluetooth connection whenever they come within close proximity of each other without repeating the authentication procedure described above.

Additionally, each of accessory device 102 and companion device 104 can establish a separate connection to Internet 106. Devices 102 and 104 can establish Internet connections using a WiFi protocol or a cellular telephone data communication protocol (e.g., 3G, 4G, etc.). Devices 102 and 104 can use a suite of protocols (e.g., Transmission Control Protocol and Internet Protocol) in conjunction with these connections to send data packets toward various destinations reachable through Internet 106 and to receive data packets originating from various sources that access Internet 106.

A server 108 is among the entities with which devices 102 and 104 can communicate over Internet 106. Server 108 can be a computing device having multiple processors, a large quantity of storage capacity, and multiple network interfaces. Server 108 can persistently store readable data and executable programs that devices 102 and 104 can request from server 108. Server 108 can receive, over Internet 106, one or more data packets that collectively represent a request from some source (e.g., device 102 or 104) for a data object specified in that request. Server 108 can respond to such a request by addressing, to the source specified in the packets received, one or more data packets that collectively represent the data object requested.

Devices 102 and 104 can periodically request data objects from server 108 over Internet 106. Data objects can include information of any kind, including program code update data and compatibility metadata, for example. Alternatively, devices 102 and 104 can subscribe to communications from server 108. In this case, server 108 can periodically send data objects over Internet 106 to devices 102 and 104. Devices 102 and 104 can execute processes that continuously listen for data objects originating from server 108 and that store and process any such data objects that arrive from server 108. As will be described in greater detail below, such data objects can represent software program updates and accompanying metadata.

B. Compatibility Metadata

Programs stored on separate devices can have dependencies relative to each other. These programs can include operating systems and application programs ("applications"), among other possible types of programs. For example, a program stored on a first device (e.g., an accessory) might be dependent on a program stored on a second device (e.g., a phone). A first program's dependence on a second program implies that an update to the second program, which increases its version, can require an update to the first program in order for the first program and the second program to remain compatible with each other. If the first program is stored on a device separate from the device stored on which the second program is stored, then conventional software update mechanisms might not be able to guarantee that these programs will be updated concurrently.

According to some embodiments, each of a user's separate devices can be kept aware of the current versions of each of the programs stored on each of the other devices of that user. Each time that one of the user's devices connects to another one of the user's devices (e.g., over a Bluetooth or WiFi connection), the devices can communicate, to each other, the current versions of the programs that are stored on those devices.

An update mechanism can provide updates to programs stored on various separate devices. In some embodiments, this update mechanism additionally maintains compatibility metadata that indicates, for multiple different programs, the various versions of one program that are compatible with a particular version of another program. For example, the compatibility metadata might indicate that versions 1.1 through 1.3, only, of a first program are compatible with version 1.0 of a second program. Continuing the example, the compatibility metadata might further indicate that versions 1.2 through 1.5, only, of the first program are compatible with version 2.0 of the second program. In some embodiments, compatibility metadata includes a compatibility classification that describes how compatible one program version is with other program versions.

The update mechanism can provide this metadata to the devices on which programs to be updated are stored. Before a particular device applies an update to the programs that it stores, that particular device can examine the version information that it most recently obtained from other devices with which that particular device has previously communicated. From this version information, the particular device can determine the current versions of each program stored on each such other device.

The particular device also can determine, from the update to be applied, the post-update versions of the programs that the update will affect. By comparing this version information with the compatibility metadata, the particular device can determine whether the post-update versions of any of the programs that it stores will become incompatible with the current versions of any of the programs that any of the other devices store.

Figure 2:
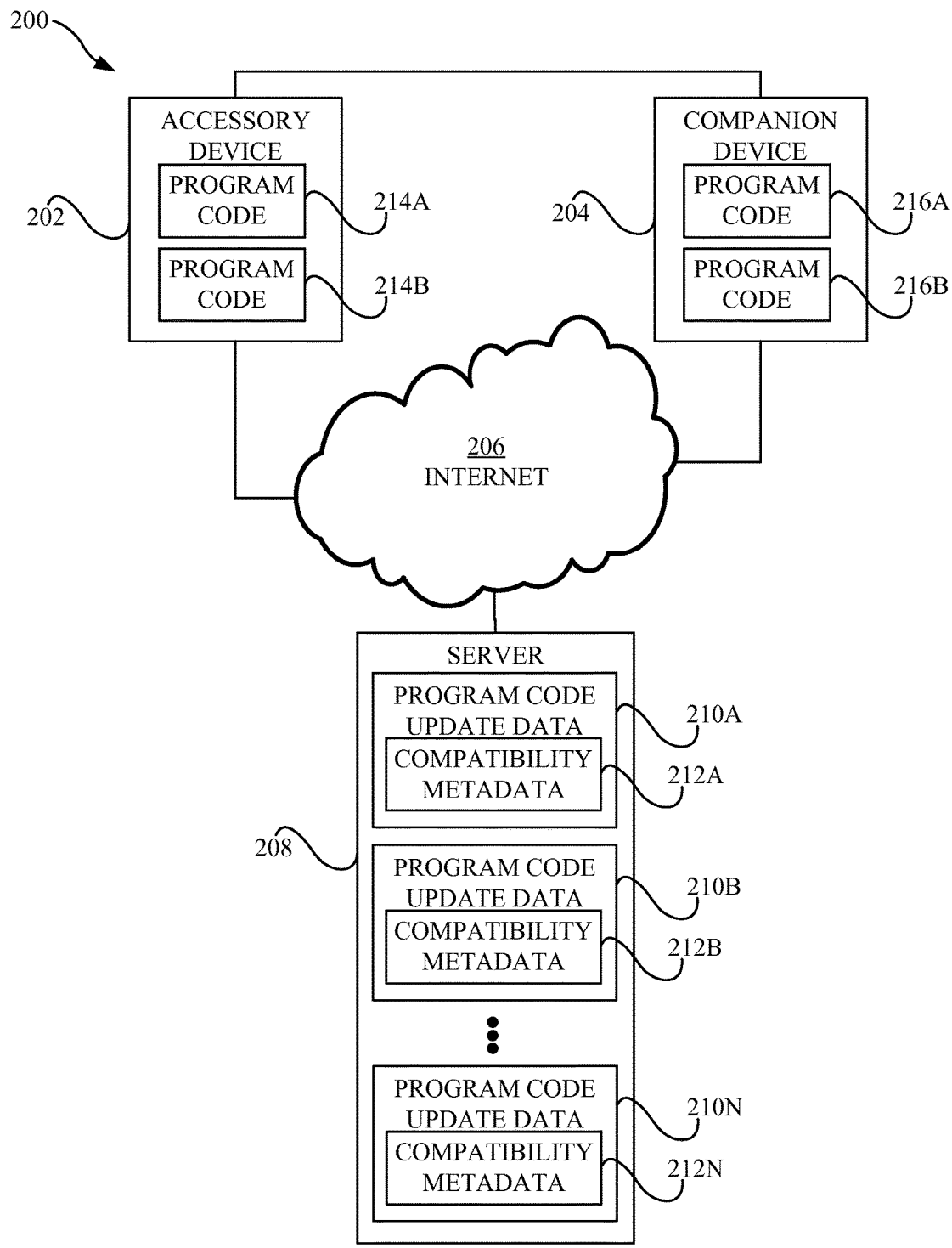
FIG. 2 is a system diagram that illustrates an example of a system in which a server stores compatibility metadata for different programs on different devices in association with program code update data for those programs, according to some embodiments.

FIG. 2 is a system diagram that illustrates an example of a system 200 in which a server stores compatibility metadata for different programs on different devices in association with program code update data for those programs, according to some embodiments. Although an embodiment illustrated in FIG. 2 includes certain components that connect in a certain configuration, some embodiments can include additional, fewer, or different components connected in different configurations.

Accessory device 202 can correspond to accessory device 102 of FIG. 1. Accessory device 202 stores program code for multiple different programs. For example, accessory device 202 stores program code 214A and program code 214B. Program code 214A represents a particular version of a first program for which multiple versions might have been created or might in the future be created. Program code 214B represents a particular version of a second program, different from the first program. Multiple versions of the second program also might have been created or might in the future be created.

Companion device 204 can correspond to companion device 104 of FIG. 1. Companion device 204 also stores program code for multiple different programs, which can be different from the programs stored on accessory device 202. For example, companion device 204 stores program code 216A and program code 216B. Program code 216A represents a particular version of a third program, different from the other programs discussed above, for which multiple versions might have been created or might in the future be created. Program code 216B represents a particular version of a fourth program, different from the other programs discussed above. Multiple versions of the fourth program also might have been created or might in the future be created.

Server 208 can correspond to server 108 of FIG. 1. Server 208 can store multiple different items of program code update data 210A-210N. Each item of program code update data 210A-210N can be associated with separate corresponding compatibility metadata 212A-212N that indicates which versions of other programs will be compatible with a new version of a particular program that will be produced from the application of that program code update data to an existing version of that particular program. These other programs can be stored on devices that are same as or different from the device on which the particular program is stored.

For example, program code update data 210A might specify an update for program code 216A. The application of this program code update data will update program code 216A from any previous version to a new specified version. In this scenario, compatibility metadata 212A can indicate which versions of program code 214A, 214B, and 216B are compatible with the new specified version of program code 216A.

For another example, assuming that program code update data 210B specifies an update for program code 214A, the application of which will update program code 214A from any previous version to a specified version, program code compatibility metadata 212B can indicate which versions of program code 214B, 216A, and 216B are compatible with that specified version.

Over Internet 206, server 208 can receive, from devices 202 and 204, identities of programs for which program code is stored on those devices. As will be discussed in additional detail below, server 208 can transmit, over Internet 206, to devices 202 and 204, items of program code update data 210A-N that are applicable to these programs. Along with each item of program code update data 210A-N that server 208 transmits to either of devices 202 and 204, server 208 can also transmit an item of compatibility metadata associated with that item of program code update data.

For example, along with program code update data 210A, server 208 can transmit compatibility metadata 212A to companion device 204. For another example, along with program code update data 210B, server 208 can transmit compatibility metadata 212B to accessory device 202. As will be discussed in additional detail below, devices 202 and 204 can use compatibility metadata (e.g., received with program code updates) to determine whether and how those program code updates should be applied to the programs to which those updates are applicable. The compatibility metadata can be used to preserve inter-program compatibility where that compatibility is deemed to be important.

C. Compatible Program Versions and Compatible Device Models

As is discussed above, versions of some programs might have limited compatibility with versions of other programs stored on the same or different devices. Compatibility metadata associated with program code update data can indicate the versions of other programs that will be compatible with a new version of a particular program following an application of that program code update data to the code of that particular program. In some cases, an incompatibility that would result between a first program on a first device and a second program on a second device due to the revision of the first program can be avoided or remedied by also updating the second program. Some new version of the second program might be compatible with the new version of the first program.

Under some circumstances, additional factors can complicate the maintenance of compatibilities between program versions. From time to time, a designer of a particular device, such as a companion or accessory device, may produce a new model of that particular device. For example, a manufacturer occasionally produces new models of a phone. When a new model of a device is produced, some programs that were executable on previous models of that device might not remain executable on the new model.

In some cases, programs or features of the new model might be innately incompatible with functions performed by any versions of an existing program that executed on previous models. Features or programs provided in the new model might supersede functions performed by prior versions of an existing program. For example, prior versions of an existing program might no longer serve any useful purpose relative to the new model. In such cases, the designer of that program might decide to permit the program to recede into obsolescence instead of attempting to generate a new version of the program.

Alternatively, when a new model of a device becomes available, a designer of a program that was executable on prior models of that device might produce a new version of that program that is executable of the new model of that device. However, the new version of that program might not be backwards compatible with prior models of that device, making the new version impossible to execute on those prior models.

Scenarios such as those discussed above can potentially result in catastrophe from the point of view of a user. A user might update a first program on a companion device only to discover not only that a current version of a second program stored on his accessory device is incompatible with the first program's new version, but also there is no new compatible version of the second program that can be executed on the model of the accessory device that he possesses (or no new version of the second program at all). Although the user might wish that he could still use the second program in conjunction with the first program, he will be unable to continue to do so with the model of the accessory device that he possesses (if at all). The user might regret having updated the first program.

To help avoid such catastrophic scenarios, some embodiments include, within compatibility metadata such as that discussed above, dependent program metadata for each program that depends on (e.g., interacts with) a particular program. More specifically, the particular program is the program for which program code update data containing that compatibility metadata is applicable. Such dependent programs are associated with devices on which they are known to execute. Each item of dependent program metadata pertaining to a dependent program can specify an earliest device model on which an earliest version of the program compatible with the new version of the particular program can execute. Examples are described with reference to FIG. 3 below.

Figure 3:
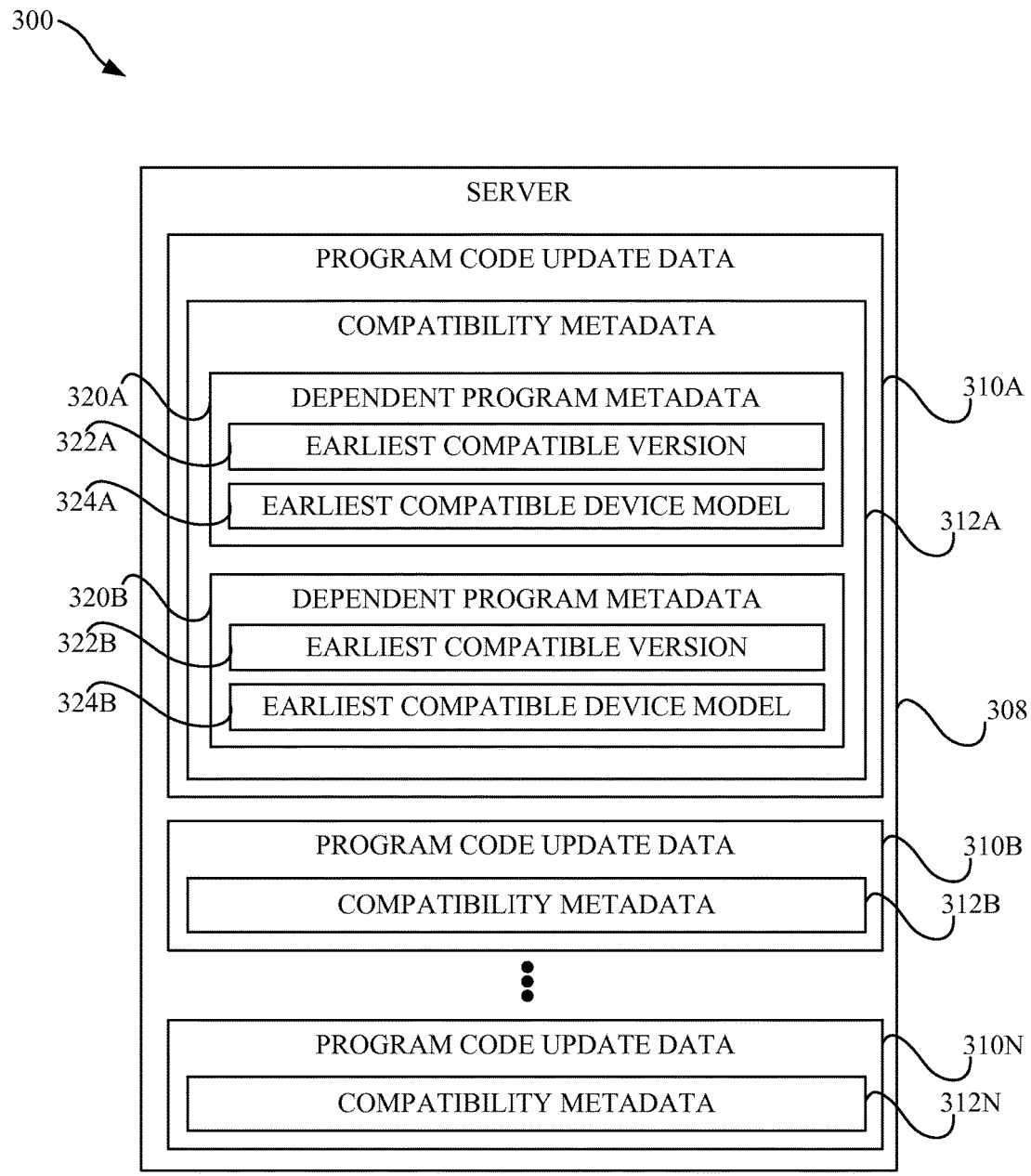
FIG. 3 is a system diagram that illustrates an example of a system in which compatibility metadata specifies model versions on which dependent programs can execute, according to some embodiments.

FIG. 3 is a system diagram that illustrates an example of a system 300 in which compatibility metadata specifies model versions on which dependent programs can execute, according to some embodiments. Although an embodiment illustrated in FIG. 3 includes certain components that connect in a certain configuration, some embodiments can include additional, fewer, or different components connected in different configurations.

System 300 includes a server 308, which corresponds to server 208 of FIG. 2. Server 308 can include program code update data 310A-310N. Each item of program code update data in data 310A-310N can correspond to a separate program for which a new version can be generated by the application of that item of program code update data to that program. Items of program code update data 310A-310N contain corresponding items of compatibility metadata 312A-312N, respectively. Each item of compatibility metadata 312A-312N can specify additional information, an example of which is described below.

As an example, compatibility metadata 312A can specify multiple items of dependent program metadata—a separate item of dependent program metadata for each dependent program that depends on the particular program to which the program code update data 310A is applicable. In the example shown in FIG. 3, items of dependent program metadata include dependent program metadata 320A and 320B.

For example, referring to both FIG. 2 and FIG. 3, program code update data 310A might be applicable to program code 216A, and program code update data 310B might be applicable to program code 216B. The programs represented by program code 214A and 214B might be dependent on the program represented by program code 216A. In this scenario, dependent program metadata 320A can correspond to program code 214A, while dependent program metadata 320B can correspond to program code 214B.

Referring again to FIG. 3, each item of dependent program code metadata can specify an earliest version of the corresponding dependent program that is compatible with the new version of the particular program upon which the corresponding dependent program depends. For example, dependent program metadata 320A can include earliest compatible version 322A, while dependent program metadata 320B can include earliest compatible version 322B.

A current version of a dependent program stored on a user's device might be earlier than the earliest compatible version of the dependent program specified. If so, then this is indicative that the current version of that dependent program will not be completely compatible with the particular program to which the program code update data is applicable following the application of that program code update data to the particular program. At the very least, partial incompatibility could arise due to a lack of configuration of the dependent program.

Additionally, each item of dependent program code metadata can specify an earliest model of the device on which the earliest compatible version of the dependent program can execute. For example, dependent program metadata 320A can include earliest compatible device model 324A, while dependent program metadata 320B can include earliest compatible device model 324B.

In addition to exchanging identities of their current program versions with each other, interacting devices such as devices 102 and 104 of FIG. 1 can exchange identities of their device models with each other. A model of a device on which a dependent program is stored might be earlier than the earliest compatible device model specified. If so, then this is indicative that the current version of that dependent program will not be compatible with the particular program to which the program code update data is applicable following the application of that program code update data to the particular program.

Potentially, a new model of the device on which an incompatible dependent program is stored might be available. In some embodiments, dependent program metadata can additionally specify compatible dependent program versions and the models of the device on which those compatible dependent program versions can execute. Such model information can be presented to a user in case of an incompatibility arising from an outdated device model, potentially inspiring the user to obtain a newer model of the device on which a compatible version of the dependent program can execute. If the user does not want to obtain a new model of the outdated device, then the user might instead opt not to apply the program code update data to the particular program to which that program code update data is applicable. Such options are discussed in greater detail further below.

D. Obtaining Code Update and Metadata from Server

In some embodiments, devices such as devices 202 and 204 of FIG. 2 can periodically query a server such as server 208 of FIG. 2 in an effort to determine whether any updates are available for any of the programs that are stored on those devices. If such an update is available, then the device storing the program for which an update is available can download, from the server, program code update metadata that is applicable to that program.

However, due to potential incompatibilities and responsive user choices, the device does not necessarily apply the program code update data automatically after that data has been downloaded and stored. Along with the program code update metadata that a device downloads from the server and stores, the device can also download the compatibility metadata that is associated with that program code update metadata. This associated compatibility metadata can be used to decide whether and how to apply the program code update metadata.

Figure 4:
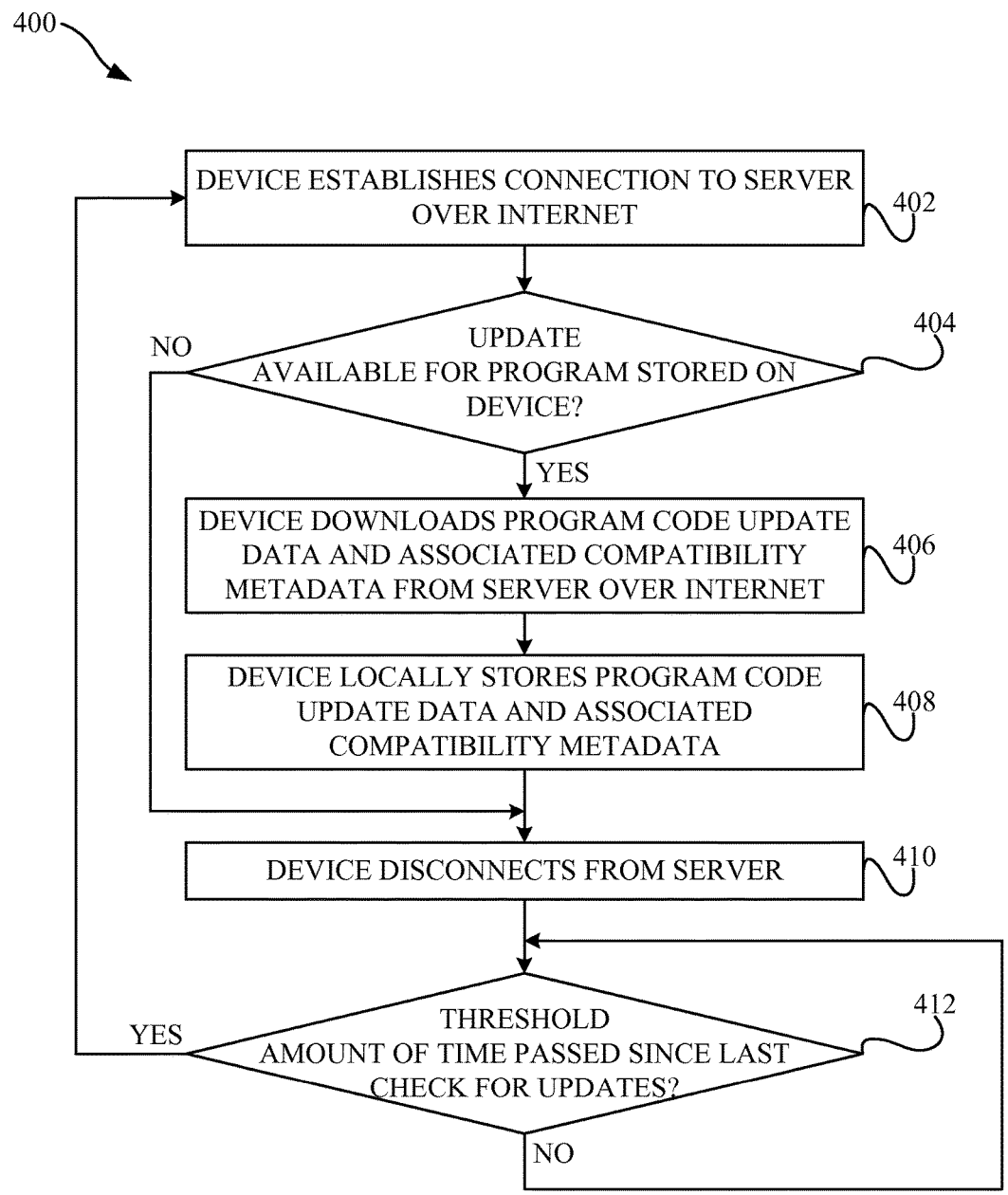
FIG. 4 is a flow diagram that illustrates an example of a technique that a device can perform periodically to detect and download, from a server, updates and associated compatibility metadata available for program that the device stores, according to some embodiments.

FIG. 4 is a flow diagram that illustrates an example of a technique 400 that a device can perform periodically to detect and download, from a server, updates and associated compatibility metadata available for program that the device stores, according to some embodiments. Although an embodiment illustrated in FIG. 4 includes certain operations being performed in a certain order, some embodiments can include additional, fewer, or different operations being performed in different orders. Technique 400 can be performed by either of devices 202 and 204 of FIG. 2, for example.

In block 402, a device establishes a connection to a server over the Internet. For example, referring to FIG. 2, companion device 204 can establish a connection to server 208 over Internet 206.

In block 404, the device determines whether an update is available for any program stored on the device. For example, companion device 204 can send, to server 208, a list of identities of programs stored on device 204 along with version identifiers for those programs. In response, server 208 can determine whether it stores program code update data for any versions of any of the programs identified.

Server 208 can respond to companion device 204 with a list of identities of programs for which server 208 stores applicable program code update data. If an update is available, then the device can proceed to obtain the update in block 406. Otherwise, the device can disconnect from the server in block 410.

In block 406, the device downloads program code update data and associated compatibility metadata from the server over the Internet. For example, for each program that companion device 204 stores for which an update is available, device 204 can download the program code update data and associated compatibility metadata from server 208 over Internet 206. Although some embodiments can involve the device automatically downloading available updates, some embodiments instead can involve the device informing a user that updates for specific programs are available. In these latter embodiments, the device can receive user input that specifies, for each available update, whether the device should download that update. The device can then download all user-selected updates.

In block 408, the device locally stores the program code update data and associated compatibility metadata. For example, companion device 204 can store, in a built-in persistent memory, separate program code update data and associated compatibility metadata for each program for which device 204 downloaded an update from server 208. The program code update data are not necessarily automatically applied to the applicable programs at that time. The device can then disconnect from the server in block 410.

In block 410, having downloaded available updates from the server or having determined that no such updates are currently available for the programs that it stores, the device disconnects at least temporarily from the server. As will be seen from the discussion below, the device can reconnect to the server to repeat the foregoing procedure after some amount of time has passed.

In block 412, the device determines whether at least a specified threshold amount of time has passed since a last time that the device checked for updates in block 404. If the threshold amount of time has passed, then the device can re-establish a connection with the server back in block 402. Otherwise, the device can repeat the determination of block 412.

As a consequence of the performance of the foregoing technique, devices can obtain relevant compatibility metadata for each program update that is applicable to a program that those devices store. As will be seen from the discussion below, devices can use compatibility data prior to the application of downloaded program updates in order to avoid or remedy incompatibilities that would arise, even between programs stored on separate devices, due to the application.

II. Incompatibility Warning and Override

Described above are systems and techniques for defining, transmitting, and storing compatibility metadata that indicates, for a new version of a program that will result from the application of program code update data to that program, which versions of other programs will be compatible with that new version. In some embodiments, prior to applying particular program code update data (e.g., through a patch or installation) that a particular device has obtained, the particular device can determine whether the application of that update data will cause an incompatibility to arise with a program stored on another device with which the particular device interacts (or with which the particular device is paired or otherwise formally and expressly associated).

If the particular device determines, based on the compatibility metadata, that some incompatibility will result from an application of the program code update data, then the particular device can issue an incompatibility warning to its user instead of applying the update data. The particular device then can receive user input that indicates that the update is not to be applied, or user input that indicates that the incompatibility has been remedied, or user input that indicates that the update is to be applied in spite of the incompatibility. The particular device can respond appropriately to the user input received by either applying the update or refraining from applying the update. The device's user is thereby informed and provides consent prior to the application of program code update data that could cause an updated program to cease interacting as it formerly did with another program, potentially stored on another device.

Figure 5:
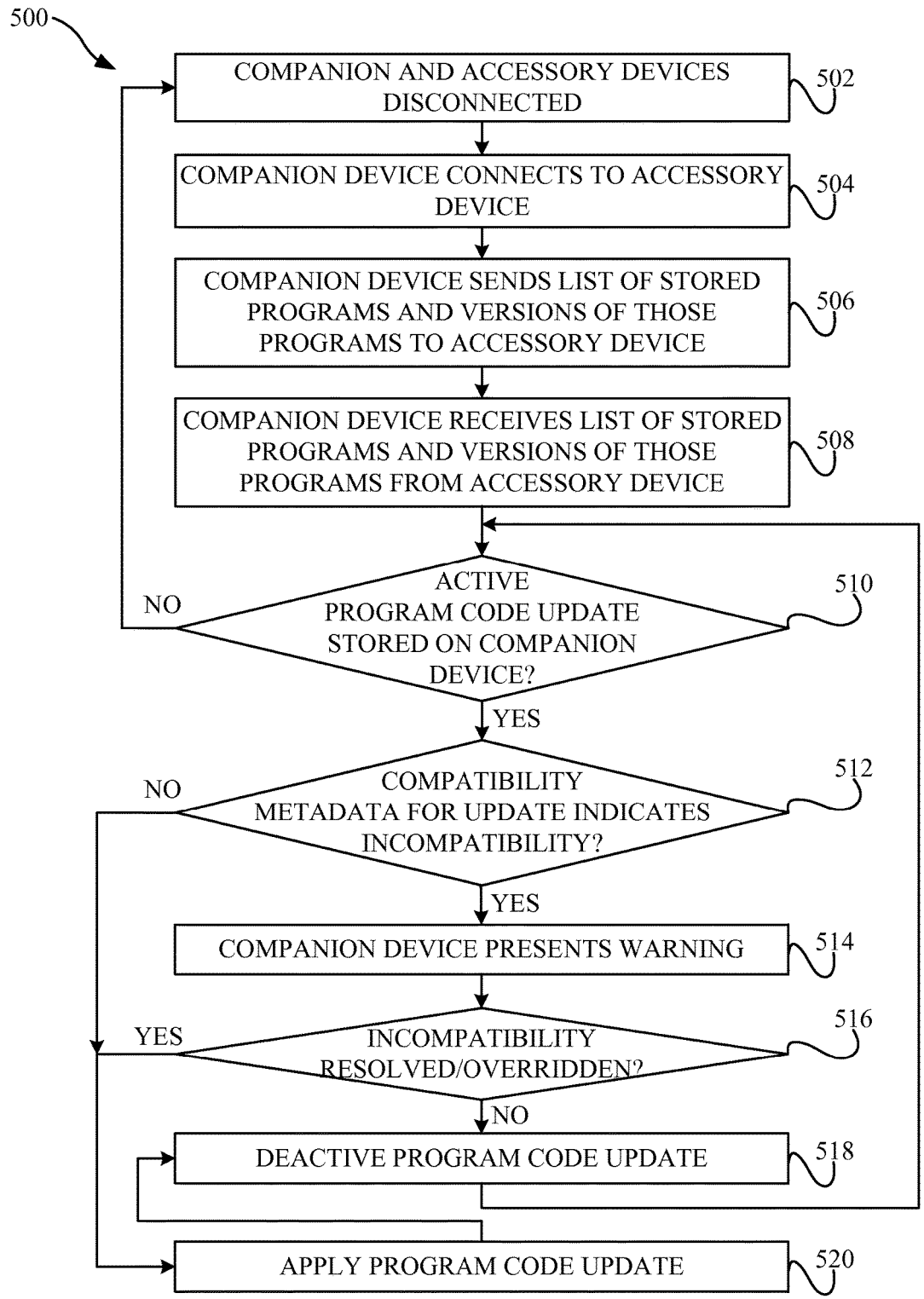
FIG. 5 is a flow diagram that illustrates an example of a technique that a particular device can perform to warn its user about an incompatibility that will arise, between versions of programs potentially stored on separate devices, from the application of a program update to a program stored on the particular device, according to some embodiments.

FIG. 5 is a flow diagram that illustrates an example of a technique 500 that a particular device can perform to warn its user about an incompatibility that will arise, between versions of programs potentially stored on separate devices, from the application of a program update to a program stored on the particular device, according to some embodiments. Although an embodiment illustrated in FIG. 5 includes certain operations being performed in a certain order, some embodiments can include additional, fewer, or different operations being performed in different orders. Although certain operations of technique 500 are described as being performed by a companion device (e.g., companion device 204 of FIG. 2) relative to an associated accessory device (e.g., accessory device 202 of FIG. 2), some embodiments can involve an accessory device performing similar operations relative to an associated companion device. Other devices also could perform technique 500.

In block 502, initially, companion and accessory devices begin in a state in which they are disconnected from each other. For example, referring to FIG. 2, companion device 204 initially can be disconnected from accessory device 202.

In block 504, the companion device connects to the accessory device. For example, companion device 204 can connect to accessory device 202 using Bluetooth, any other peer-to-peer communication, or other connection through an access point or other intermediary.

In block 506, the companion device sends a list of programs that it stores, and version identifiers for those programs, to the accessory device. For example, over the connection, companion device 204 can send, to accessory device 202, a list that identifies programs represented by program code 216A and 216B, along with version identifiers identifying current versions of those programs.

In block 508, the companion device receives, from the accessory device, a list of programs that the accessory device stores, and version identifiers for those programs. For example, over the connection, companion device 204 can receive, from accessory device 202, a list that identifies programs represented by program code 214A and 214B, along with version identifiers identifying current versions of those programs.

Thus, in some embodiments, following each performance of the operations of blocks 504-508, the companion and accessory devices each become aware of the versions of the programs that the other device currently stores. The devices can use this information relative to program code updates in a manner described below.

In block 510, the companion device determines whether an active—meaning downloaded but not yet applied—program code update is stored on the companion device. For example, companion device 204 can determine whether any program code update data files remaining in its memory are not yet flagged as having been applied. If at least one active program code update is stored on the companion device, then the companion device can examine the compatibility metadata associated with the program code update data to determine potential incompatibilities in block 512. Otherwise, the companion device can disconnect from the accessory device at least temporarily, later to reconnect with the accessory device back in block 502.

In block 512, having determined that at least one active program code update is stored on the companion device, the companion device determines whether the compatibility metadata associated with the active program code update data indicates incompatibility between (a) the version to which a particular program will be updated as a result of the application of the update data and (b) current versions of any other programs, including programs stored on the accessory device. As is noted above with respect to block 508, the companion device can periodically refresh its knowledge of the versions of the programs that are currently stored on the accessory device. If the companion device determines that an incompatibility would arise, then the companion device can warn its user in block 514. Otherwise, the companion device can proceed to apply the active program code update data to the program to which that update data is applicable in block 520.

In block 514, having determined that at least one incompatibility would arise from the application of the active program code update, the companion device presents a warning to its user. For example, companion device 204 can display a message identifying each other program relative to which an incompatibility would be produced, as well as actions (if any) that can be taken to remedy this incompatibility (e.g., updating a version of a specified dependent program, configuring a current version of the specified dependent program, etc.). Additionally or alternatively, companion device 204 can emit a warning sound and/or vibrate in a warning manner.

In some embodiments, the companion device additionally can present, to its user, selectable options for (a) overriding the warning and proceeding with the update, (b) indicating that incompatibilities have been resolved, and/or (c) skipping the application of the update. In such embodiments, the companion device can receive user input selecting any of these options.

In block 516, the companion device determines whether incompatibilities and their corresponding warnings have been resolved (e.g., through the update of versions of other programs or the configuration of existing versions of those other programs) or overridden without resolution (e.g., due to the user's expressed preference). In some embodiments, failure to either resolve all existing incompatibilities or expressly override all existing incompatibility warnings is construed as a decision to refrain from applying the program code update.

If all existing incompatibilities and their warnings have been resolved or overridden, then the companion device can proceed to apply the active program code update data to the program to which that update data is applicable in block 520. Otherwise, the companion device can deactivate the program code update in block 518.

In block 518, having determined that fewer than all existing incompatibilities and their warnings have been resolved or overridden, or following the application of program code update data as described below, the companion device deactivates the particular program code update. For example, companion device 204 can flag the particular program code update data with a flag that indicates that the update data has been deactivated without application due to incompatibilities, or a flag that indicates that the update data has been applied, depending on the situation. For another example, companion device 204 can simply delete the particular program code update data from its memory. After deactivating the particular program code update, the companion device can determine whether any other active program code updates are stored in its memory back in block 510.

Alternatively, in block 520, having determined either that no incompatibilities would arise from the application of the active program code update, or that such incompatibilities and their warnings have been resolved or overridden, the companion device applies the program code update data to the program code of the program to which that update data is applicable. For example, companion device 204 can use stored program code update data to patch existing program code 216A or to install a new version of program code 216A, overwriting the previous version. The program is thereby updated to the new version. The companion device can then deactivate the applied program code update data back in block 518.

III. Restricting Interdevice Data Traffic Based on Compatibility Classification

In some embodiments, a compatibility classification can be determined based on compatibility metadata. The compatibility classification can indicate how compatible (if at all), program versions are. The compatibility classification can indicate, for example, that program versions are fully incompatible (in which case an update of a program other than the target of the program update prospectively being applied might resolve the incompatibility), or that program versions are fully compatible, or that program versions can become compatible if user configuration is performed relative to the program other than the target of the program update prospectively being applied.

Based on the compatibility classification, a device can transition to a corresponding state in which an identity service (IDS) process executing on the device limits the transmissions of certain application-originated messages destined externally to the device. Each state in a set of states is associated with a different set of message types. The device maintains metadata that indicates, for each application that executes on the device, the types of messages that the application is capable of sending. While the device is in a particular state, the IDS can consult this metadata to delay the transmission of messages originating from applications that are not capable of sending messages of a message type associated with the device's current state. The device can delay the transmission of messages temporarily by placing those messages in a queue maintained within the device.

As various events occur during the program update procedure, a device can transition to different states in the set of states discussed above. Eventually, if incompatibilities between program versions do not exist or can be resolved, the device can transition to a state in which a program update can be applied to its target, and in which the IDS process executing on that device allows the transmission of all types of outbound messages.

A. Identity Service Message Filtering and Queuing

According to some embodiments, mechanisms present within interacting devices can delay the delivery of device-outbound messages that might have detrimental effects while one or the other of the devices is attempting to resolve incompatibilities that would arise from the application of a program update relative to a program stored on one of those devices.

Figure 6:
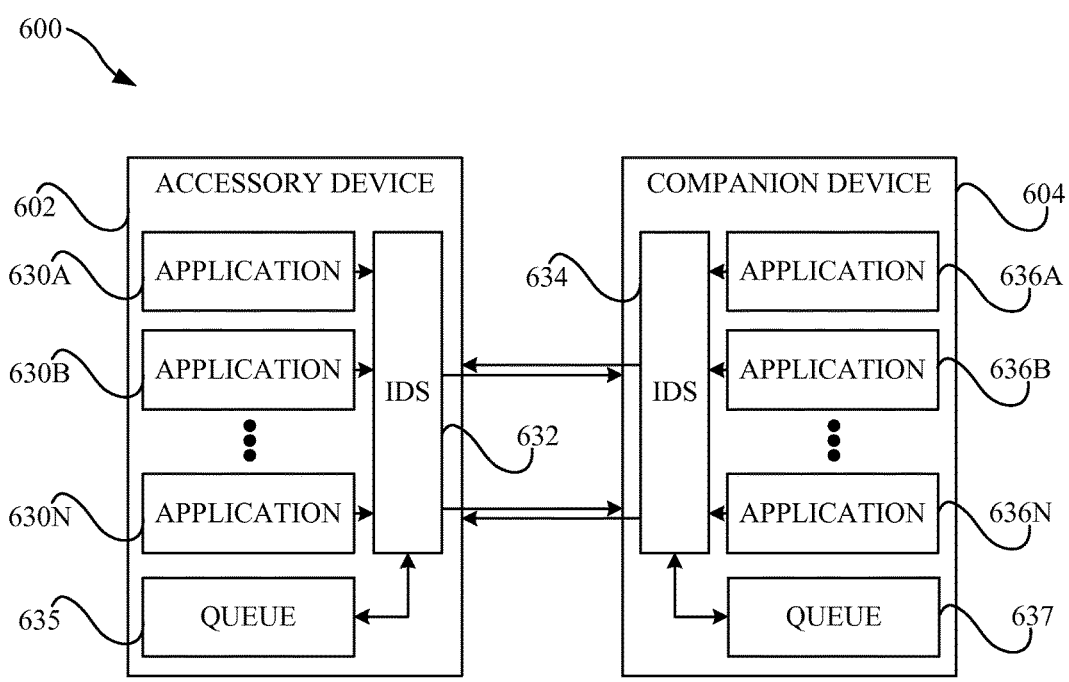
FIG. 6 is a system diagram that illustrates an example of a system in which identity service processes executing on accessory and companion devices can filter and queue, based on current states of those devices, certain application-generated messages destined for the other one of those devices, according to some embodiments.

FIG. 6 is a system diagram that illustrates an example of a system 600 in which identity service (IDS) processes executing on accessory and companion devices can filter and queue, based on current states of those devices, certain application-generated messages destined for the other one of those devices, according to some embodiments. Although an embodiment illustrated in FIG. 6 includes certain components that connect in a certain configuration, some embodiments can include additional, fewer, or different components connected in different configurations.

System 600 includes accessory device 602 and companion device 604. Accessory device 602 executes applications (programs) 630A-630N, including 630B. Companion device 604 executes applications (programs) 636A-636N, including 636B. Accessory device 602 executes one instance of an identity service (IDS) process 632. Companion device 604 executes another instance of the IDS process 634. Accessory device 602 maintains a queue 635. Companion device 604 also maintains a queue 637.

In some embodiments, IDS process 632 intercepts messages that originate from applications 630A-630N and that are destined for delivery to a destination external to accessory device 602. Similarly, in some embodiments, IDS process 634 intercepts messages that originate from applications 636A-636N and that are destined for delivery to a destination external to companion device 604. An IDS process can be any process for communicating messages, e.g., an IDS process can act as a daemon process.

At different moments in time, and based on compatibility classifications determined during the potential application of program updates on either of devices 602 and 604, devices 602 and 604 can be in different states, discussed in greater detail below. Based on the state in which a particular device currently is, the IDS process executing on that device can determine whether to allow various messages originating from applications executing on that device to pass through to the other device.

When the IDS process executing on a device determines that a particular message is not to be allowed to pass through at that time, while its device is in its current state, the IDS process can place that message into the queue maintained on that device. Messages placed into a queue in this manner can be delivered by the IDS process later when the device transitions to a state in which delivery of those particular messages is permissible.

B. Device States

As is discussed above, interacting devices such as accessory and companion devices can be in different states during the attempted but merely potential application of a program update. In some embodiments, a device's current state is based on a compatibility classification that represents how compatible versions of different programs—possibly stored on separate devices—are with each other. Typically, one such version will be a current version of a program existing on one device, while the other such version will be a new version to which a particular program existing on another device will be updated as a result of an application of program code update data to that particular program. The compatibility classification can be maintained within, or derived from, compatibility metadata such as is described above.

A compatibility classification can indicate that versions of two programs are incompatible (although a different version of one program might remedy the incompatibility). Alternatively, a compatibility classification can indicate that versions of two programs are incompatible, but could potentially become compatible following the user configuration of a program that is dependent upon the particular program to which an update can be applied. Still alternatively, a compatibility classification can indicate that versions of two programs are completely compatible. Such compatibility classifications can be determinative of device states during the program update procedure.

Figure 7:
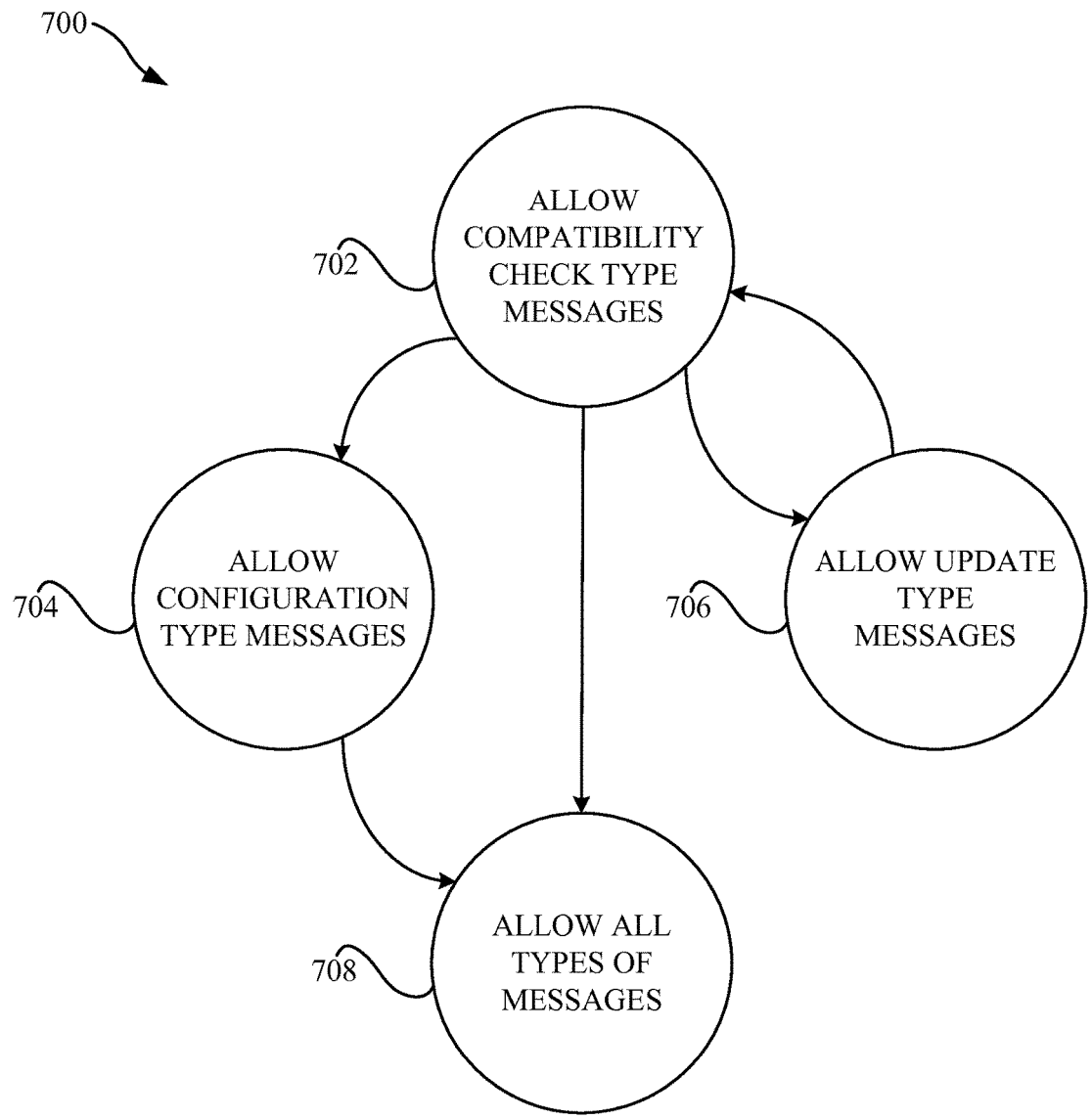
FIG. 7 is a state diagram that illustrates a finite state automaton that represents different states that devices can assume during a program update procedure, as well as transitions that can occur between those states, according to some embodiments.

FIG. 7 is a state diagram that illustrates a finite state automaton 700 that represents different states that devices can assume during a program update procedure, as well as transitions that can occur between those states, according to some embodiments. Although an embodiment illustrated in FIG. 7 includes certain states that are linked by certain state transitions, some embodiments can include additional, fewer, or different states linked with different state transitions. Devices 602 and 604 of FIG. 6 can assume the states of finite state automaton 700, for example.

In each of states 702-708, an IDS process executing on a device can allow certain types of messages to pass out of that device to external destinations, while that IDS process can delay the delivery of other types of messages by temporarily placing those messages in a queue at least until a state transition occurs.

At the commencement of a program update procedure, in which program code update data stored on a device can prospectively be applied to a program stored on that device, the device can begin in state 702, in which an IDS process executing on that device allows compatibility check-type messages to be transmitted out of the device. This does not necessarily imply that the IDS process checks a type of any individual message. Instead, the IDS process can determine whether an application originating a message is known to send compatibility check-type messages. If so, then, in some embodiments, the IDS process can allow the transmission of the message to proceed, even if that message is not actually a compatibility check-type message itself.

From state 702, a device can transition to state 704 (example of a configuration state) in response to the occurrence of events that are described below. In state 704, the IDS process executing on a device allows configuration-type messages to be transmitted out of the device. The IDS process can determine whether an application originating a message is known to send configuration-type messages. If so, then, in some embodiments, the IDS process can allow the transmission of the message to proceed, even if that message is not actually a configuration-type message itself.

From states 702 and 704, a device can transition to state 708 (example of a general state) in response to the occurrence of events that are described below. In state 708, the IDS process executing on a device allows all types of messages to be transmitted out of the device.

From state 702, a device can transition to state 706 (examples of an update state) in response to the occurrence of events that are described below. In state 706, the IDS process executing on a device allows update-type messages to be transmitted out of the device. The IDS process can determine whether an application originating a message is known to send update-type messages. If so, then, in some embodiments, the IDS process can allow the transmission of the message to proceed, even if that message is not actually an update-type message itself. In response to the occurrence of events that are described below, the device can transition from state 706 back to state 702.

C. Application Message Type Metadata

As is discussed above in connection with FIG. 7, a device can assume different states during a program update procedure. Also as is discussed above, whether or not an IDS process executing on a device transmits or queues a particular message while its device is in a particular state can be based on the types of messages that an application originating that message is known to send, rather than a type of the particular message itself.

Figure 8:
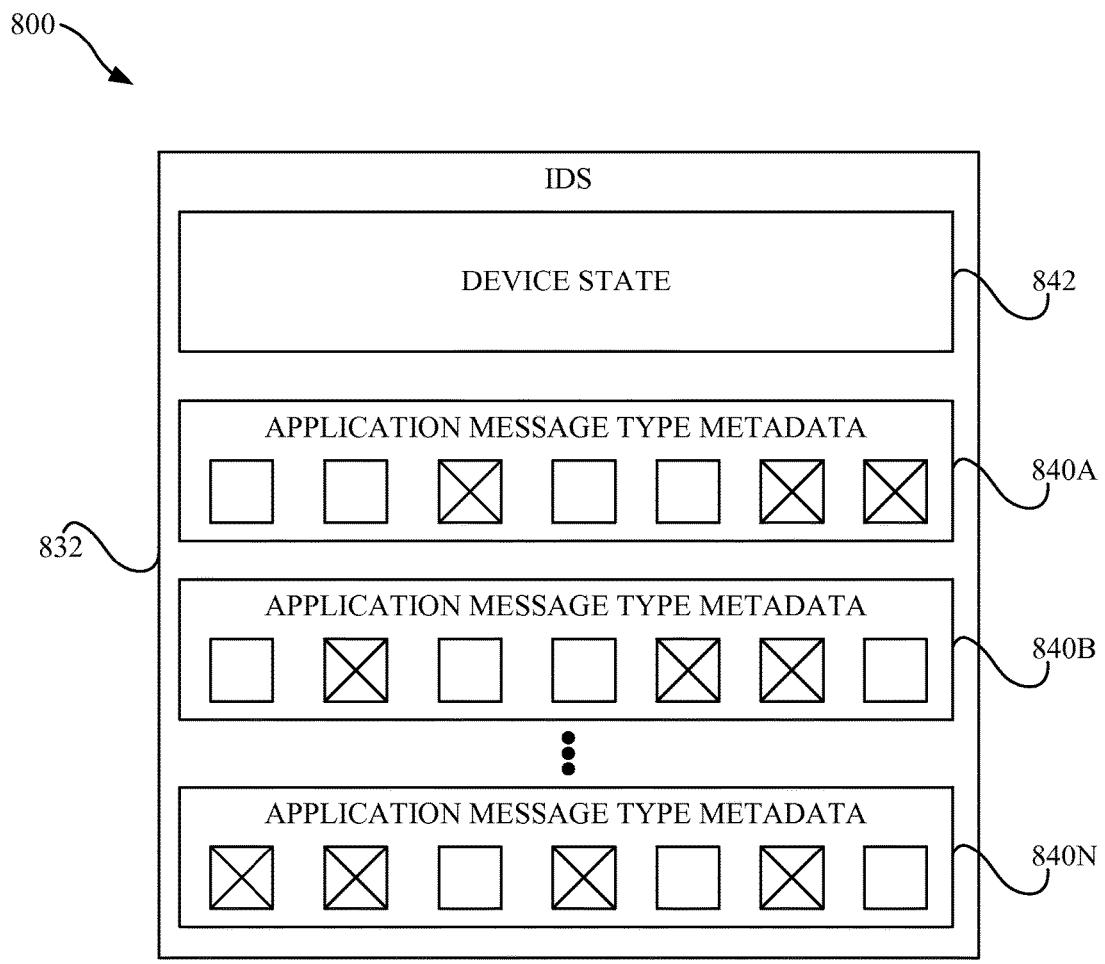
FIG. 8 is a system diagram that illustrates an example of a system that includes an identity service process (IDS) that maintains both current device state and metadata for different applications specifying the types of messages that those applications are capable of originating, according to some embodiments.

FIG. 8 is a system diagram that illustrates an example of a system 800 that includes an identity service process (IDS) that maintains both current device state and metadata for different applications specifying the types of messages that those applications are capable of originating, according to some embodiments. System 800 can be implemented within devices 602 and 604 of FIG. 6, for example.

System 800 includes IDS 832. IDS 832 can maintain device state 842 for a device. Device state 842 can be different ones of states 702-708 illustrated in FIG. 7, for example.

IDS 832 additionally maintains application message type metadata 840A-N. IDS 832 can maintain a separate item of this metadata for each program that is stored on its device. For example, application message type metadata 840A may pertain to application 630A of FIG. 6, while application message type metadata 840B may pertain to application 630B of FIG. 6.

In some embodiments, for each different message type in a set of specified message types, each item of application message type metadata 840A-N can indicate whether the application to which that metadata pertains is capable of sending (e.g., programmed to send) any messages of that message type. Thus, in FIG. 8, the presence of an "X" in a box of a metadata item signifies that the corresponding application is capable of sending messages of a type corresponding to that box, while the absence of an "X" in that box signifies that the corresponding application is incapable of sending messages of that type.

In some embodiments, in determining whether to queue a message temporarily or to allow that message to pass through to its intended destination, IDS 832 can determine from which of several applications executing on the device the message originated. IDS 832 can then examine the application message type metadata that is associated with that originating application to determine which types of messages that application is capable of sending.

In some embodiments, as long as the originating application is capable of sending messages of a type whose transmissions are currently allowed based on the device's current state, IDS 832 forwards the message on towards its destination—typically the other device. Otherwise, in such embodiments, IDS 832 places the message at least temporarily in its device's queue, until the device transitions to a state in which the transmission of a type of message that the originating application is capable of sending is permissible, at which point IDS 832 can remove the message from the queue and transmit it.

D. Compatibility Classification-Driven Message Handling

Figure 9:
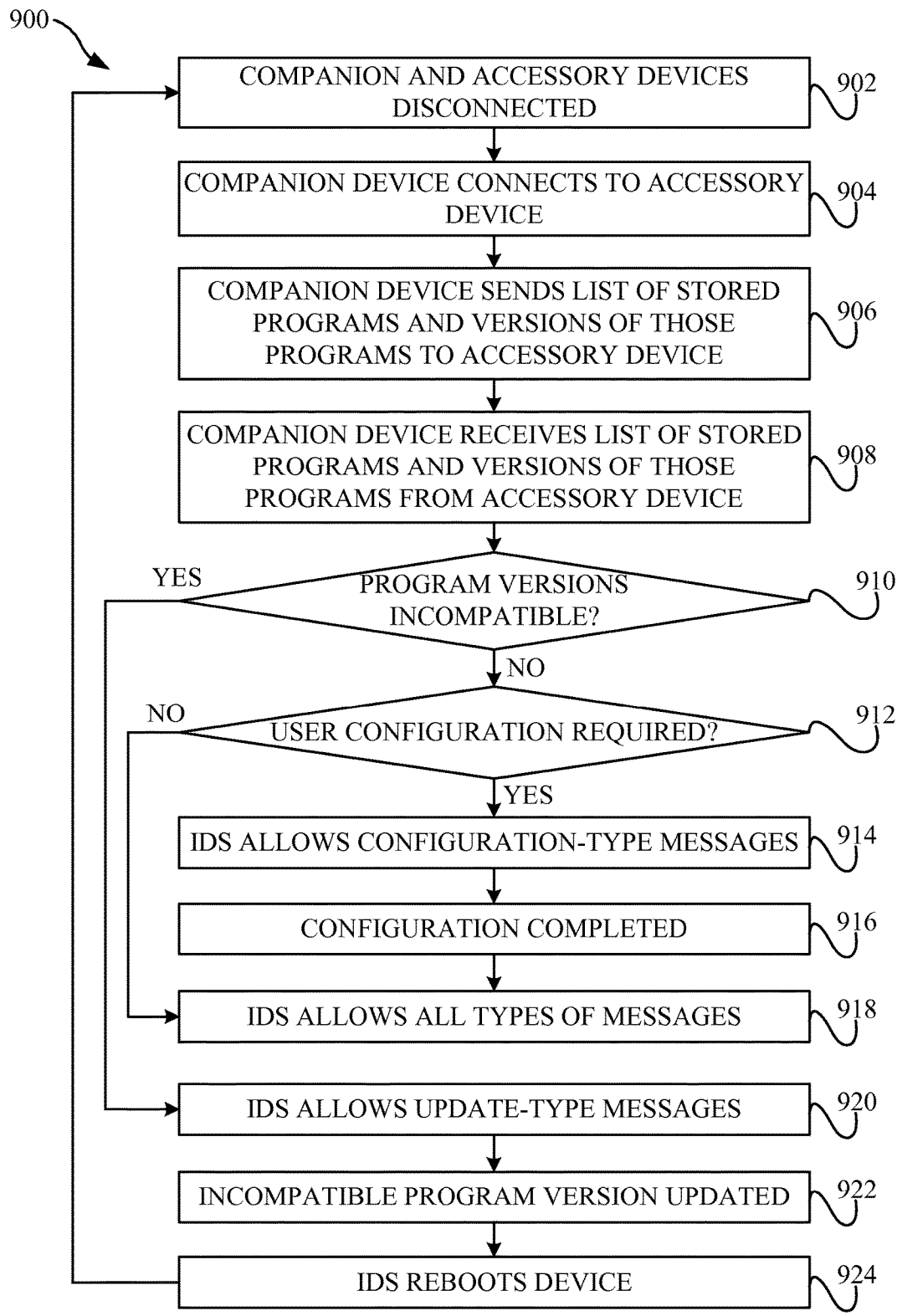
FIG. 9 is a flow diagram that illustrates an example of a technique that a device can perform during a program update procedure to limit message traffic between devices based on compatibility classifications between program versions, according to some embodiments.

FIG. 9 is a flow diagram that illustrates an example of a technique 900 that a device can perform during a program update procedure to limit message traffic between devices based on compatibility classifications between program versions, according to some embodiments. Although an embodiment illustrated in FIG. 9 includes certain operations being performed in a certain order, some embodiments can include additional, fewer, or different operations being performed in different orders. Although certain operations of technique 900 are described as being performed by a companion device (e.g., companion device 604 of FIG. 6) relative to an associated accessory device (e.g., accessory device 602 of FIG. 6), some embodiments can involve an accessory device performing similar operations relative to an associated companion device. Other devices also could perform technique 900.

In block 902, companion and accessory devices are initially disconnected from each other.

In block 904, the companion device connects to the accessory device (e.g., using Bluetooth).

In block 906, the companion device sends, to the accessory device, a list of programs stored on the companion device as well as identities of the current versions of those programs. The list of programs can be all programs or a specific subset of programs.

In block 908, the companion device receives, from the accessory device, a list of programs stored on the accessory device as well as identities of the current versions of those programs.

In block 910, the companion device determines, based on a compatibility classification between (a) a new version of a particular program that would be produced by the program update and (b) a current version of a dependent program (potentially stored on the accessory device) that depends on the particular program, whether the versions are incompatible. The compatibility classification can be specified by, or derived from, compatibility metadata associated with program code update data as discussed above.

The compatibility classification can indicate how compatible the two versions of the programs are with each other. For example, the compatibility classification can indicate that the two versions are fully incompatible (although a version update might remedy the incompatibility), fully compatible, or prospectively compatible following user configuration of the program that is not the target of the program update.

If the versions are incompatible, then an IDS process of the companion device can allow update-type messages to be transmitted from the companion device in block 920. Otherwise, the companion device can determine whether user configuration of the program that is not the target of the program update is required to achieve compatibility in block 912.

In block 912, responsive to a determination that the program versions are not incompatible (but are at least potentially compatible), the companion device determines, based on the compatibility classification, whether user configuration of the program that is not the target of the program update is required to achieve compatibility. If so, then an IDS process of the companion device can allow configuration-type messages in block 914. Otherwise, the versions are fully compatible without configuration, and the IDS process of the companion device can allow all types of messages in block 918.

In block 914, responsive to a determination that user configuration of the program that is not the target of the program update is required to achieve compatibility, an IDS of the companion device can allow configuration-type messages to be transmitted out of the companion device. The companion device can transition to state 704 of FIG. 7. In this state, the incompatibility can potentially be resolved through user configuration of the version of the program that is not the target of the program update.

In block 916, user configuration of the version of the program that is not the target of the program update (the dependent program) is completed. For example, configuration can be achieved through a user manually specifying values for one or more parameters within a "settings" user interface of the version of the dependent program. These parameters can govern at least some aspects of the behavior of the dependent program. In some embodiments, an update process executing on the companion device can instruct a user regarding how the dependent program is to be configured. This update process can request user input that verifies that the configuration of the dependent program actually has been performed. In response to receiving affirmative user input, the update process can proceed to operate on the assumption that the configuration of the dependent program actually was performed.

In block 918, responsive either to the user configuration of block 916 or a determination that no configuration is required to achieve compatibility in block 912, the IDS of the companion device allows all types of messages to be transmitted out of the companion device. The companion device can transition to state 708 of FIG. 7. In this state, the program update can be applied to its target program. Technique 900 concludes.

Alternatively, in block 920, responsive to a determination that the versions are incompatible, an IDS of the companion device can allow update-type messages to be transmitted out of the companion device. The companion device can transition to state 706 of FIG. 7. In this state, the incompatibility can potentially be resolved by updating (if an update is available) the version of the program that is not the target of the program update.

In block 922, the incompatible program version that is not the target of the program update is, itself, updated. For example, a user of the accessory device can direct the update of that program to a new available version. This can potentially resolve the incompatibility, since the previous version is no longer a participant in the compatibility determination. A new compatibility classification can be determined based on the new version.

In block 924, the IDS of the companion device reboots the companion device following the update of the program on the accessory device. This rebooting causes the companion device to disconnect again from the accessory device back in block 902.

E. Delivery of Messages Based on Message Type

Figure 10:
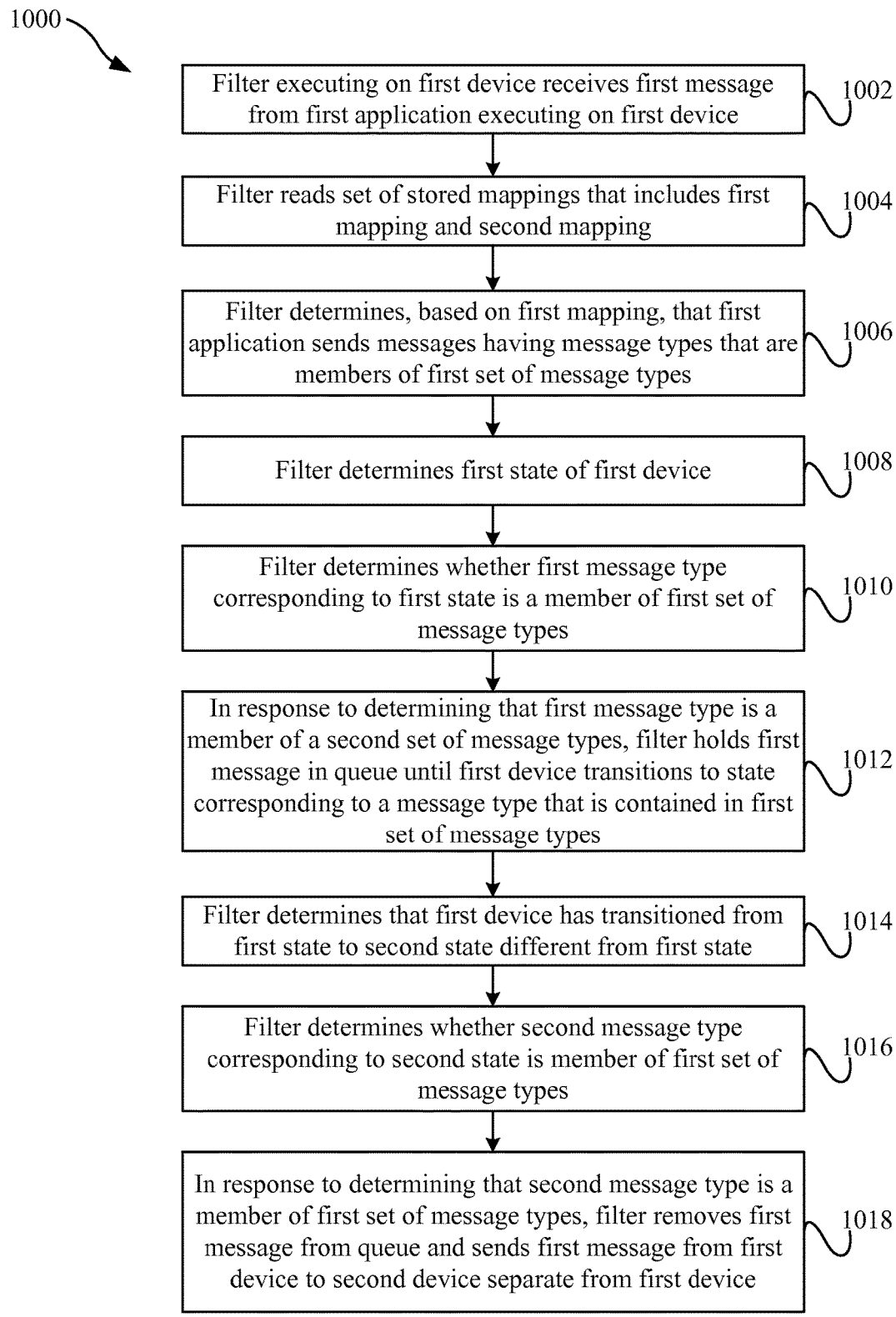
FIG. 10 is a flow diagram that illustrates an example of a technique for varying delivery of different types of messages based on device state and message origin, according to some embodiments.

FIG. 10 is a flow diagram that illustrates an example of a technique 1000 for varying delivery of different types of messages based on device state and message origin, according to some embodiments. Although an embodiment illustrated in FIG. 10 includes certain operations being performed in a certain order, some embodiments can include additional, fewer, or different operations being performed in different orders.

In block 1002, a filter executing on a first device receives a first message from a first application executing on the first device.

In block 1004, the filter reads a set of stored mappings that includes a first mapping and a second mapping. The first mapping maps the first application to a first set of message types. The second mapping maps a second application, executing on the first device separately from the first application, to a second set of message types different from the first set of message types. Each mapping can be a stored association between (a) an identity of an application and (b) an identity of one or more message types, such as configuration-type messages, update-type messages, and compatibility check-type messages.

In block 1006, the filter determines, based on the first mapping, that the first application sends messages having message types that are members of the first set of message types. The first message is one of the first set of message types. For example, the filter can find, within a set of mappings that associate various applications with various message types, a particular mapping that pertains to the first application. The message types specified within this particular mapping are the message types that the first application is capable of sending.

In block 1008, the filter determines a first state of the first device. For example, referring to FIG. 7, the filter can determine whether the first device is currently in state 702, 704, 706, or 708.

In block 1010, the filter determines whether a first message type corresponding to the first state is a member of the first set of message types. For example, if the first state is an "allow update type messages" state, then the first message type corresponding to that state can be "update-type" messages. In this scenario, the filter can determine whether the first message type, "update-type," is a member of the first set of message types, which includes every type of message that the first application is capable of sending. For another example, if the first state is an "allow configuration type messages" state, then the first message type corresponding to that state can be "configuration-type" messages. In this scenario, the filter can determine whether the first message type, "configuration-type," is a member of the first set of message types, which includes every type of message that the first application is capable of sending.

In block 1012, in response to determining that the first message type is a member of a second set of message types, the filter holds the first message in a queue until the first device transitions to a state (e.g., one of states 702, 704, 706, and 708 of FIG. 7) corresponding to a message type (e.g., "update-type," "configuration-type," "compatibility check-type") that is contained in the first set of message types. As is illustrated in FIG. 6, the queue can be stored within a memory of the same device on which the filter executes. In some embodiments, the second set of message types is a set of types of messages that the first application is incapable of sending.

In block 1014, the filter determines that the first device has transitioned from the first state to a second state different from the first state. For example, referring to FIG. 7, the filter can determine that the first device has transitioned to a different one of states 702, 704, 706, or 708 than the state in which the first device was determined to be in block 1008.

In block 1016, the filter determines whether a second message type corresponding to the second state is a member of the first set of message types. For example, if the second state is an "allow update type messages" state, then the second message type corresponding to that state can be "update-type" messages. In this scenario, the filter can determine whether the second message type, "update-type," is a member of the first set of message types, which includes every type of message that the first application is capable of sending. For another example, if the second state is an "allow configuration type messages" state, then the second message type corresponding to that state can be "configuration-type" messages. In this scenario, the filter can determine whether the second message type, "configuration-type," is a member of the first set of message types, which includes every type of message that the first application is capable of sending.

In block 1018, in response to determining that the second message type is a member of the first set of message types, the filter removes the first message from the queue and sends the first message from the first device to a second device separate from the first device. For example, a filter executing on an accessory device can remove a message from a queue on the accessory device. The filter can send that message to a companion device.

IV. Updating Software on Accessory, with Confirmation

The discussion above related to a coordination of updating software (and messages about such coordination) between a companion device and an accessory device. The following discussion relates to an example where the software being updated is the operating system of the accessory, but the discussion also applies to other software updates on the accessory device.

This section provides more details for updating software on the accessory device, as facilitated by the companion device. For example, the companion device can obtain a new version of the software (e.g., in portions) from a server at the request of the accessory device, and provide the new version of the software to the accessory device. This process can occur over minutes, hours, days, etc. In some implementations, the software update of the accessory device can be initiated at the companion device. The companion device can communicate with the accessory device before and after the update to determine whether the update was successful. A notification about the update can then be provided (e.g., displayed) to a user.

A. Method

Figure 11:
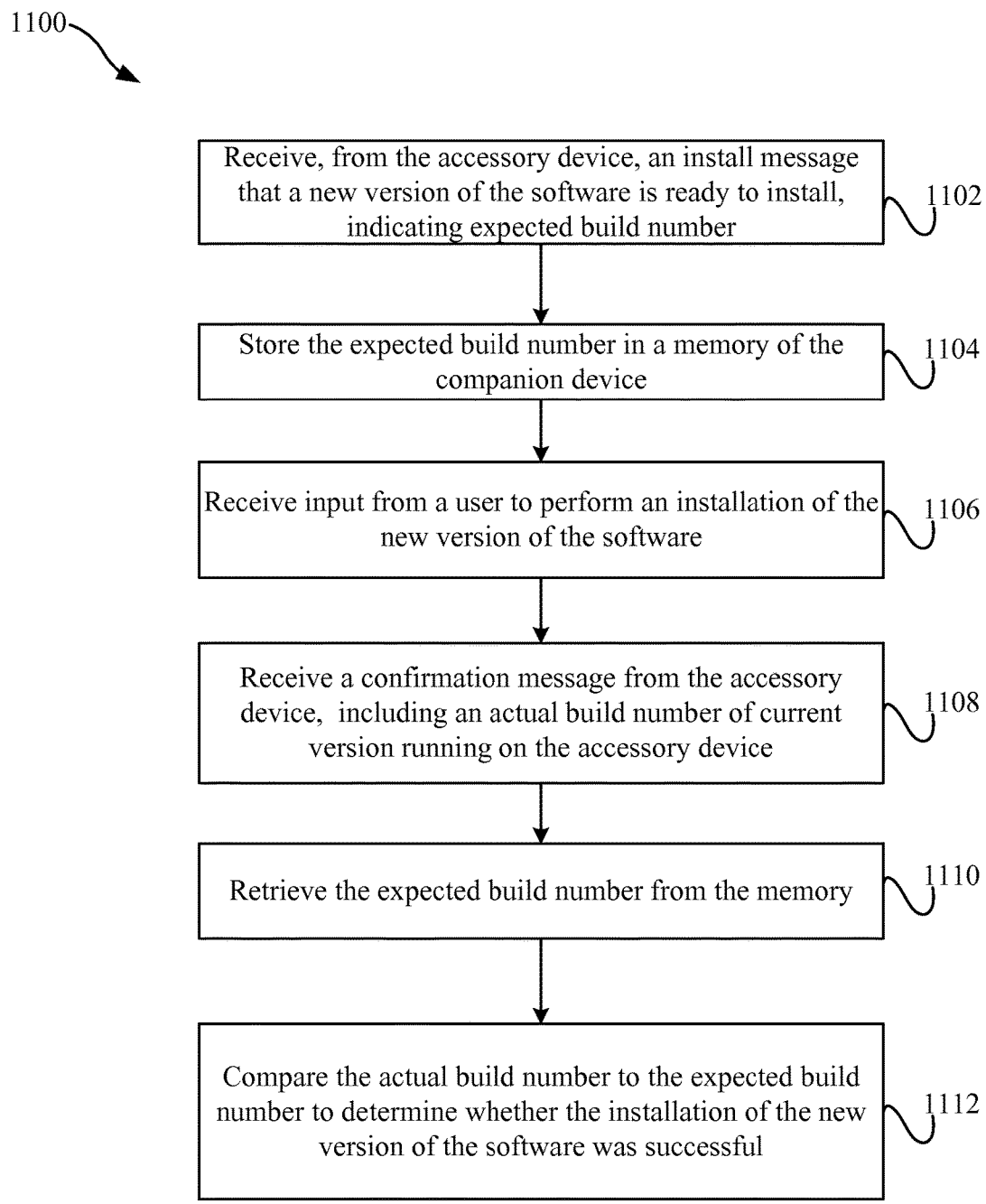
FIG. 11 is a flowchart illustrating a method of facilitating an update of software on an accessory device using a companion device according to embodiments of the present invention.

FIG. 11 is a flowchart illustrating a method 1100 of facilitating an update of software on an accessory device using a companion device according to embodiments of the present invention. Method 110 can be performed by a companion device having one or more processors and a memory. As examples, the companion device can be a smartphone, and the accessory device can be a watch, which can have one or more processors.

At block 1102, the companion device receives, from the accessory device, an install message that a new version of the software is ready to install on the accessory device. In some embodiments, the accessory device can send the install message when the new version of the software has been downloaded and is available at the accessory device. In other embodiments, the install message can be sent before or after the new version has been completely downloaded at the accessory device.

The install message identifies an expected build number of the new version. The expected build number can be designated by an entity that developed the new version of the software. In some embodiments, the install message can include the expected build number. In other embodiments, the companion device can receive the expected build number when the companion device acts as a proxy for obtaining the new version from another computer (e.g., a server). The install message can identify the expected build number that the companion device already has, e.g., by providing a shared identifier that has been communicated between the companion device and accessory device, or the shared identifier corresponds to the expected build number. The shared identifier may simply be a name of the software, with the companion device can use to identify the expected build number that corresponds to a specific software being updated, as opposed to any other field numbers of other software of the accessory device. If the update scheme is only used for the operating system of the accessory device, the install message can simply indicate that an update is to be performed, and the companion device will know to use the one expected build number that was received from the other computer (server).

At block 1104, the expected build number is stored in a memory of the companion device. As mentioned above, the expected build number can be stored by companion device upon receipt from the computer that is providing the new version of the software. In an embodiment where the expected build number is obtained from the install message, the companion device can store the expected build number after receiving the install message.

The expected build number can be stored in association with other information regarding the accessory device. For example, the companion device may store settings, current operational values, and other information the user with a companion device may want to know about the accessory device. The expected build number can be stored in association with an identifier of the software (e.g., a name of the software). In this manner, the build number for this particular software can be differentiated from build numbers of other software of the accessory device. The companion device can store a previous build number of a previous version, as discussed below.

At block 1106, the companion device receives input from a user to perform an installation of the new version of the software on the accessory device. For example, once an install message has been received from accessory device, the companion device can prompt the user for input. The user can specify that installation of the new version of the software on the accessory device should proceed. Such user input can be made to audio, a touchscreen, or any other input device.

In other embodiments, the user can navigate to an application page for the accessory device. The application page can indicate that installation of the new version is ready. The user can then provide the input for proceeding with the install. Thus, the companion device may not automatically prompt the user after receiving an install message.

At block 1108, the companion device receives a confirmation message from the accessory device. The confirmation message includes an actual build number of a current version of the software running on the accessory device. The accessory device may send the confirmation message after the accessory device has attempted to perform the installation.

The confirmation message may be sent after the accessory device has rebooted. The companion device can lose a connection to the accessory device after receiving input from the user to perform the installation, and then re-establish the connection to the accessory device. The confirmation message can then be received after re-establishing the connection to the accessory device. In some embodiments, the confirmation message may be sent as part of a handshake protocol that occurs between the companion device and the accessory device after the accessory device reboots.

At block 1110, the companion device retrieves the expected build number from the memory. The retrieval of the expected build number can occur in response to receiving the confirmation message. The confirmation message may include an identifier for the software such that the companion device knows which build number to retrieve from memory, i.e., so as to differentiate between the numbers of various software on the accessory device.

At block 1112, the companion device compares the actual build number to the expected build number to determine whether the installation of the new version of the software was successful. The comparison can determine whether the two build numbers are a match. For example, if the actual build number is different from the expected build number, then the installation can be determined to not have them successful. Further, in some embodiments, the companion device can determine that the actual build number corresponds to the previous version of the software. For example, the companion device can store build numbers of previous versions; and when the actual build number corresponds to a previous version, the companion device can determine that the accessory device reverted back to a previous version when the installation was not successful.

In some embodiments, the confirmation message can include additional information about the installation. The companion device can use such additional information to determine whether the installation was successful. If the process has been started, a flag can be set to indicate that the accessory device is updating the software. If the flag has not been set, then the companion device can forgo any comparison of the build number that may be received after a reboot of the accessory device.

B. Update

An update process for software on the accessory device can be initiated on the companion device or on the accessory device. The update process can involve determining whether a new version is available in downloading the new version to the accessory device.

As an example for initiating on the accessory device, a software update scan can be performed periodically (e.g., every seven days) to check if there is an update available. The scan can run as a background process on the accessory device. The software update scan can involve the requests to a server to determine whether a new version is available. The request can be transmitted via the companion device. If the new version is available, the companion device can assist in downloading the new version and send the version to the accessory device.

A speed and timing for downloading of the new version can be dependent on a battery level of the companion device and/or the accessory device. For example, if the companion device has a low battery level and is not charging, the downloading can be delayed until the battery level is above the threshold or until the companion device is charging. Messages can be sent from accessory device to the companion device to provide a percentage of completion, which can be provided to a user. The companion device can request such information from the accessory device, or the accessory device can provide such information once specified thresholds are reached.

The accessory device can download the new software version and then prepare a file for installing. The download may occur over an extended period of time, e.g., depending on battery strength and other factors. Thus, the companion need not store the entire download, but simply pass a current portion to the accessory device.

At the end of the preparation of the update, e.g., when the update is almost ready to be applied, the accessory can send a message to the companion device to inform the companion device that the update is about ready to install. In response to this install message, the companion device can inform the user so that the user can see that there is an update. The user can agree to terms and conditions of the update and approve to apply the update.

As an example for initiating the update process on the companion device, a user can navigate to an application designated for interfacing with the accessory device. The user can open a navigation pane for managing the accessory device, and then select to check for an update, e.g., in a section for software update on a settings page. The same navigation pane may be used to approve an update for version that has already been downloaded to the accessory device. In one implementation, the request by the user on the companion activates a background process on the accessory, e.g., as described above. And, thus the trigger for an update scan can be a periodic timing or a request from user on the companion device.

Once the new version has been identified, the user can be prompted to start a download and install process. For example, when the user taps on a "Download and Install" button, the companion device can send a message to the accessory device, instructing the accessory device to start the download. Once the download is finished, the accessory device can send an install message to companion device; the companion device can prompt the user to begin the install.

C. Confirmation

If the installation was successful, the companion device can provide a confirmation notification to the user that the installation was successful. For example, the companion device can display or speak a message indicating that the software is up-to-date. Thus, when the accessory device reboots as part of the update process, the user can be confident to know that the installation was successful as a result of the confirmation notification. If the installation was not successful, the user can be informed, and the user can reinitiate the installation process.

For an update of an operating system (OS), the accessory device loses the wireless connection with the companion device. If the installation is successful, the new OS starts up on the accessory device. The accessory device then tries to reconnect to the companion device. The accessory device sends the build number of that OS to the companion device upon reconnecting. The companion should then be able to know if the installation was successful given the actual build number and the confirmation message. If the build number is different, then a general error could be displayed. Other embodiments could have more specific errors, e.g., that the accessory device went back to a previous OS or that no reconnection with the accessory device has been made (e.g., if no response has been received from accessory device within a specified time).

Various user interfaces (UIs) can be provided on the companion device regarding the update process. One UI can indicate that a scan for an update is being performed. Another UI can indicate that the update is available and ready for download. A user can be prompted to activate a button to start downloading. Another UI can indicate that the update is currently downloading, and the progress of the download can be shown. Another UI can indicate that the update is preparing after the invention has downloaded. Once the new version is downloaded and prepared and a user has consented, a UI can indicate that the new version is installing on the accessory device. After installation, a notification about the success can then be provided in another UI.

D. Resulting State

In various embodiments, there can be three different resulting states of the software on the accessory device after installation attempt. The installation update can be successful, which can be conveyed to the user that the update is completed and the user can resume using the accessory device.

A second outcome can be that the update failed, but the accessory device is back to the previous version. Thus, the installation failed but the accessory device is still usable. If installation failed but the accessory device restored back to a previous version, the companion device would get an actual build number, but it would not match to an expected build number. As mentioned above, the companion device could track previous build numbers. But, the companion device could make a determination of the restoration to a previous version based just on the to build numbers not matching. An error message could be provided to the user, indicating that the installation was not successful; the error message could include that the accessory device reverted back to a previous version.

A third outcome can be a failure where the accessory fails to go back to a usable state. For example, if the update failed midway in applying the update, the accessory may now be unusable because the accessory device has built up the new OS and removed the previous OS. In such a situation, the accessory device can display a URL or other instructions for re-activating the device. In some embodiments, if there is no reconnection after a specified amount of time, the companion device can provide an error message to the user. A timer can be started when the input is received from the user to perform the installation.

V. Service Compatibility at Transport Layer

As mentioned above, there is a need to have backwards compatibility with previous versions. Further enhancements can make sure that the transport layer does not misbehave if there are different services available on either side of the link. To support this, embodiments can add a minimum compatibility version to the configuration of a service. When a client application tries to send a message using a particular service, embodiments can compare a compatibility version obtained from the other device upon an initial connection against a compatibility version in the message. The message can be rejected if the two versions are not compatible.

A. Services

In some embodiments, a client application can use a service (also called a communication service) of a first device to communicate with another device. The service may comprise one or more system routines of the first device that can be used to communicate with the other device. The device may have multiple services, each corresponding to different communication channels for communicating with another device. The other device may have an application corresponding to the client application of the first device. For example, a first service may exist for communicating mail messages. A second service they exist for communicating calendar events.

A service may be defined by various settings (properties) of one or more transport protocols. A service can be defined by a specific set of properties that are stored in a configuration file of the operating system. In some embodiments, a different configuration file can exist for each service. In various implementations, the configuration files can be static or dynamically created. When the operating system is booted up, the services configuration file can be loaded. A client application that uses the service can create an instance of the service to communicate with another device.

In some embodiments, a client application may use only one specific service. In other embodiments, a client application may use different services, with a particular service being used for a particular type of communication to a particular device. Another service might be used for a different type of communication or for a different device.

A new version of an operating system may add new services, which may include adding properties to an existing service, thereby creating a new service. Thus, a particular service may only be available to devices running the new version of the operating system, or later versions. For example, a new service may be added for communicating to a new device (e.g., a watch). Without the new service, a client application may not be able to communicate with the new device. As another example, a client application on the first device may not be able to communicate with a new operating system on the other device, depending on which operating system is running on the first device.

Issues can arise when a device running the new version is communicating with a device that is running an older version. The different devices can determine a version running on the other device using embodiments described herein.

B. System

Figure 12:
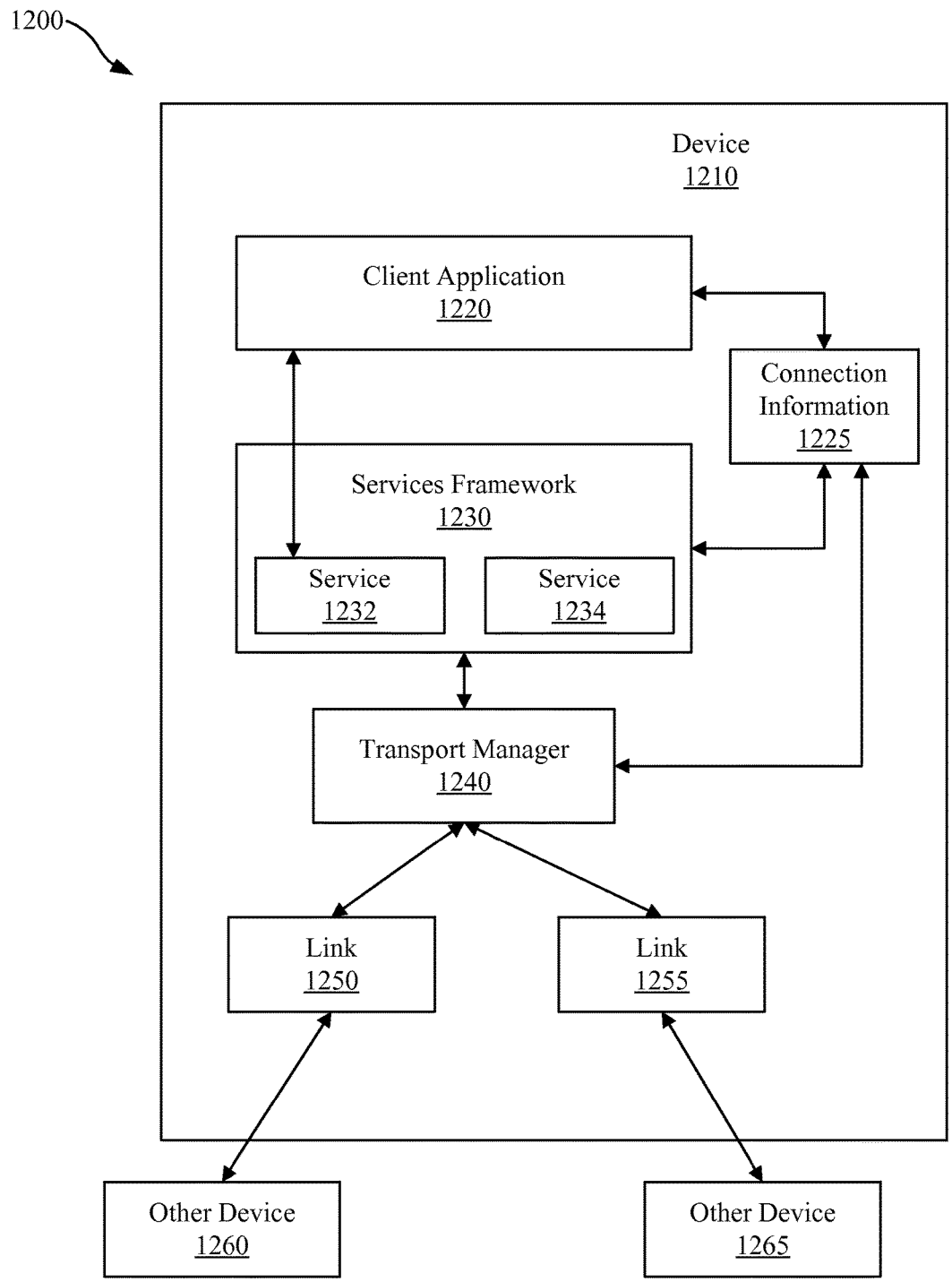
FIG. 12 shows a system of a device using a services framework to communicate with other devices according to embodiments of the present invention.

FIG. 12 shows a system 1200 of a device 1210 using a services framework to communicate with other devices according to embodiments of the present invention. Device 1210 can establish connections with other devices 1260 and 1265. A client application 1220 on device 1210 can send messages to the other devices 1260 and 1265. A link 1250 may be used to communicate with other device 1260. A link 1255 may be used to communicate with other device 1265. A link can use any suitable protocol, e.g., Bluetooth, Bluetooth low energy (BTLE), Wi-Fi, and the like. A link can include separate software instances for each of the links. Different software links can share the same underlying hardware to create the connection.

A transport manager 1240 can be used in establishing a connection with another device e.g., other device 1260. When a connection is first established with another device, transport manager 1240 can determine and store connection information 1225 about the other device. For example, a version of an operating system can be determined, where the operating system can correspond to particular services being available or not being available. For example, device 1210 can store a lookup table that tracks which services are available on which operating systems of devices that device 1210 is currently paired, in current communication, or has connected to previously.

A services framework 1230 can include various services that are available on device 1210. As shown, services framework 1230 includes service 1232 and service 1234, but many other services can be available. Upon connection with other device 1260, device 1210 can perform a handshake with device 1260, and other device 1260 can request communication via a particular service. Services framework 1230 can determine whether or not the service is available, and potentially whether the service is available for a particular client application.

Accordingly, device 1210 can obtain a software version running on other device 1260. For example, device 1210 can tell other device 1260 that it is running a particular version, which may be specified as the actual version number (e.g., 8) or some offset value (e.g., 0). Whereas, another device might specify a newer version (e.g., 9) or offset value (e.g., 1).

The services that existed in version 8 can exist on a device with a minimum compatibility version of 0, and services that are added to version 9 can have a minimum capability version of 1. Services framework 1230 may store such compatibility information about various services that are available. Services framework 1230 can determine that device 1210 has version 9 and other device 1260 has version 8, where device 1210 knows that messages cannot be sent to device 1260 via services with a compatibility version of 1. In such a case, services framework 1230 can reject a request to send such messages via services having a compatibility version of 1 to device 1260.

Further, services framework 1230 can communicate available services to client application 1220 for communication to other device 1260. In this manner, services framework 1230 can inform client application 1220 to not send messages to other device 1260 using certain services, as it is known that other device 1260 does not support those services. In another implementation, client application 1220 can check or otherwise use connection information 1225 to determine whether a particular service is available.

However, as a failsafe, services framework 1230 (or transport manager 1240) can perform an additional check to ensure that no messages are sent via an unavailable service. For example, client application 1220 can make a specific request to use service 1232 to send a message to other device 1260, and services framework 1230 can check whether service 1232 is available for communication with other device 1260. Services framework 1239 can use connection information 1225 to determine whether a particular service is available for communication to a particular device. Thus, before a message for other device 1260 is sent to transport manager 1240 using service 1232, services framework 1230 can check whether the message should even be sent based on whether service 1232 is available to other device 1260.

In other embodiments, transport manager 1240 can perform any checks to confirm whether a particular service is available at another device. For example, transport manager 1240 can receive a message from service 1232, where the message specifies the requesting service, or the requesting service is otherwise implicitly known via the request from a particular service. Transport manager 1240 can then use connection information 1225 to determine whether service 1232 is available. As other examples, the messages can include a minimum compatibility version, or a service can specify a minimum compatibility version in a payload, which may also include a message for sending to the other device.

In some embodiments, client application 1220 can send the message to transport manager in a payload that also includes a specification of the service to be used. Transport manager 1240 can use the service specification to send the message when the other device supports the service. In such an embodiment, services framework 1230 may not exist, and transport manager 1240 can perform a compatibility check.

C. Multiple Destinations

In some embodiments, a message can have multiple destinations. For example, in FIG. 12, a message might be marked for sending to other device 1260 and other device 1265. It can happen that other device 1260 may be running version 9 of an operating system, and other device 1265 may be running version 8 of an operating system. Thus, if client application 1220 is using a service that is only available to version 9, the message cannot be sent to other device 1265. In such a case, the user or client application 1220 could send two messages. However, some embodiments can make the determination at a lower level of which device to send the message, e.g., at services framework 1230 or transport manager 1240.

Accordingly, when messages are received at a certain layer, that layer can determine the availability for each of the destination devices. As mentioned above, information about versions running on the destination devices can be obtained that were obtained after a connection to a destination device has been established. Such version numbers and compatibilities can be stored for later retrieval. The stored compatibility information can be used to check which devices support the service being used.

As an example, a phone my communicate with multiple watches. Some of the watches may be running the most current software, but some may not. A user may want to send a notification from the user's phone to watches of friends in the vicinity. But, the user does not want to configure different messages for different watches having different versions of software. Thus, the client application can be configured to send a single message, and a lower layer can determine which devices support the service to which the notification is sent. If none of the watches support the service, an error message can be sent. In another example, if at least one of the watches supports the service, no error message is sent to the user. In yet another example, a success message can sent to the user only if all the watches support the service. In some embodiments, the client application sending the message (e.g., via user input) can specify whether a partial send (i.e., to only some of the watches) is to be classified as a success.

D. Method

Figure 13:
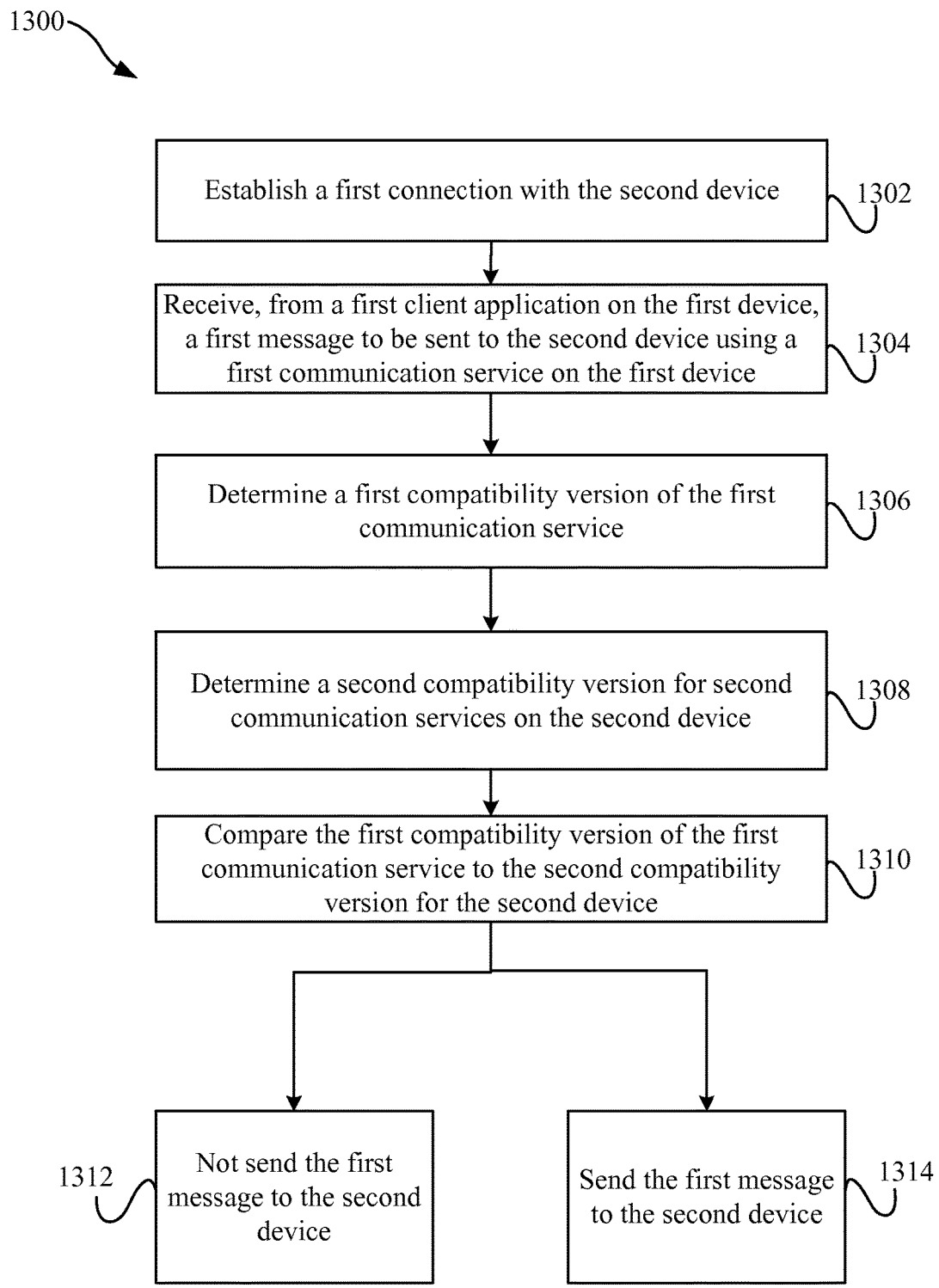
FIG. 13 is a flowchart illustrating a method of managing communications of a first device with a second device according to embodiments of the present invention.

FIG. 13 is a flowchart illustrating a method 1300 of managing communications of a first device with a second device according to embodiments of the present invention. Method 1300 may be performed by the first device. Various components of the first device may be used. For example, a services framework and/or a transport manager may be used for one or more blocks of method 1300.

At block 1302, a first connection is established with the second device. Other connection can be established with other devices, e.g., when a message is sent to multiple destinations. At or soon after time of establishing a connection, information about the second device can be obtained, e.g., in a handshake process.

At block 1304, a first message to be sent to the second device using a first communication service on the first device is received from a first client application on the first device. In various embodiments, the first message may be received at various software modules, e.g., a services framework or a transport manager, or other modules in a transport layer. Accordingly, the first message can be received at a transport layer that determines whether the first communication service on the first device is compatible with the second communication services on the second device.

In another embodiment, the first message can be received at a services framework that determines whether the first communication service on the first device is compatible with the second communication services on the second device. The services framework can send the first message to a transport layer for sending to the second device.

At block 1306, a first compatibility version of the first communication service is determined. The first compatibility version can be determined in various ways, e.g., from a configuration file for the first communication service or by querying a table containing compatibility version for services on the first device.

At block 1308, a second compatibility version for second communication services on the second device is determined. The second compatibility version can be obtained the second compatibility version from the second device (e.g., in a handshake process). The second compatibility version can be stored in association with connection information for the second device. And, the second compatibility version can be retrieved in response to receiving the first message.

At block 1310, the first compatibility version of the first communication service is compared to the second compatibility version for the second device to determine whether the first communication service on the first device is compatible with the second communication services on the second device.

At block 1312, in response to determining that the first communication service on the first device is not compatible with the second communication services on the second device, the first message is not sent to the second device. The determination not to send can be performed as fail safe, e.g., in case the first client application has made an error.

At block 1314, in response to determining that the first communication service on the first device is compatible with the second communication services on the second device, the first message is sent to the second device. It can be determined whether the first message can be sent to multiple devices by checking compatibility of the first communication service against the compatibility for the second device.

Method 1300 can be repeated for a second client application on the first device when a second message is be sent using a third communication service on the first device. A third compatibility version of the third communication service can be determined and compared to the second compatibility version for the second device.

A second connection can be established with a third device, wherein the first message is to be sent to the second device and the third device. A third compatibility version can be determined for third communication services on the third device. The first compatibility version of the first communication service can be compared to the third compatibility version for the third device to determine whether the first communication service on the first device is compatible with the third communication services on the third device. A success message can be sent to the first client application when the first message is sent to at least one of the second device and the third device.

A second message to be sent using a third communication service can be received from the first client application. A third compatibility version of the third communication service can be determined. The third compatibility version of the third communication service can be compared to the second compatibility version for the second device to determine whether the third communication service on the first device is compatible with the second communication services on the second device.

VI. Hardware Overview

Figure 14A:
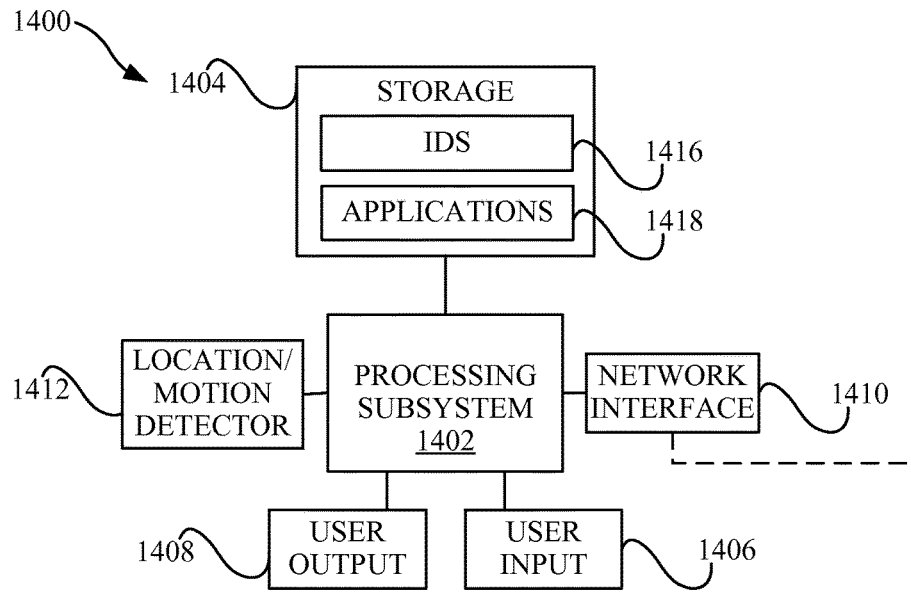
FIG. 14A is a simplified block diagram of an implementation of an accessory device according to some embodiments.

FIG. 14A is a simplified block diagram of an implementation of an accessory device 1400 according to some embodiments. Device 1400 can be a mobile device, a handheld device, a notebook computer, a desktop computer, or any suitable electronic device with a screen for displaying images and that is capable of communicating with a companion device 1450 as described herein. In some embodiments, device 1400 is a wearable device such as an Apple iPod, headphones, or a watch. Device 1400 includes a processing subsystem 1402, a storage subsystem 1404, a user input device 1406, a user output device 1408, a network interface 1410, and a location/motion detector 1412.

Processing subsystem 1402, which can be implemented as one or more integrated circuits (e.g., one or more single-core or multi-core microprocessors or microcontrollers), can control the operation of device 1400. In various embodiments, processing subsystem 1402 can execute a variety of programs in response to program code and can maintain multiple concurrently executing programs or processes. At any given time, some or all of the program code to be executed can be resident in processing subsystem 1402 and/or in storage subsystem 1404.

Through suitable programming, processing subsystem 1402 can provide various functionality for device 1400. For example, processing subsystem 1402 can execute an identity service (IDS) process (or "IDS") 1416. IDS 1416 can limit certain message traffic from being transmitted to companion device 1450 based on a state of accessory device 1400. IDS 1416 can perform various embodiments described herein.

Storage subsystem 1404 can be implemented, e.g., using disk, flash memory, or any other storage media in any combination, and can include volatile and/or non-volatile storage as desired. In some embodiments, storage subsystem 1404 can store one or more application programs to be executed by processing subsystem 1402 (e.g., applications 1418). In some embodiments, storage subsystem 1404 can store other data (e.g., used by and/or defined by IDS 1416). Programs and/or data can be stored in non-volatile storage and copied in whole or in part to volatile working memory during program execution.

A user interface can be provided by one or more user input devices 1406 and one or more user output devices 1408. User input devices 1406 can include a touch pad, touch screen, scroll wheel, click wheel, dial, button, switch, keypad, microphone, or the like. User output devices 1408 can include a video screen, indicator lights, speakers, headphone jacks, or the like, together with supporting electronics (e.g., digital-to-analog or analog-to-digital converters, signal processors, or the like). A customer can operate input devices 1406 to invoke the functionality of device 1400 and can view and/or hear output from device 1400 via output devices 1408.

Network interface 1410 can provide voice and/or data communication capability for device 1400. For example, network interface 1410 can provide device 1400 with the capability of communicating with companion device 1450. In some embodiments, network interface 1410 can include radio frequency (RF) transceiver components for accessing wireless voice and/or data networks (e.g., using cellular telephone technology, Bluetooth technology, advanced data network technology such as 5G, 4G or EDGE, WiFi (IEEE 802.11 family standards, or other mobile communication technologies, or any combination thereof), and/or other components). In some embodiments network interface 1410 can provide wired network connectivity (e.g., Ethernet) in addition to or instead of a wireless interface. Network interface 1410 can be implemented using a combination of hardware (e.g., antennas, modulators/demodulators, encoders/decoders, and other analog and/or digital signal processing circuits) and software components.

Location/motion detector 1412 can detect a past, current or future location of device 1400 and/or a past, current or future motion of device 1400. For example, location/motion detector 1412 can detect a velocity or acceleration of mobile electronic device 1400. Location/motion detector 1412 can comprise a Global Positioning Satellite (GPS) receiver and/or an accelerometer. In some instances, processing subsystem 1402 determines a motion characteristic of device 1400 (e.g., velocity) based on data collected by location/motion detector 1412. For example, a velocity can be estimated by determining a distance between two detected locations and dividing the distance by a time difference between the detections.

Figure 14B:
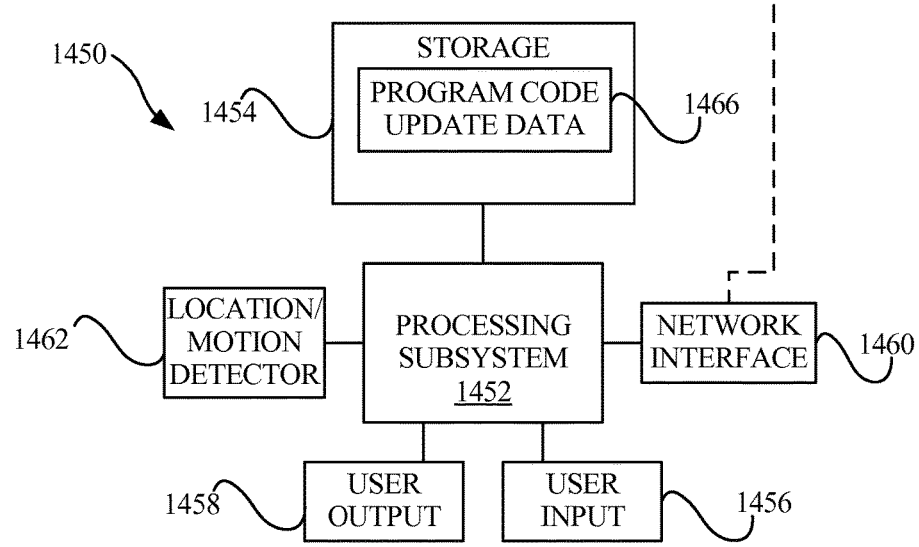
FIG. 14B is a simplified block diagram of an implementation of a companion device according to some embodiments.

FIG. 14B is a simplified block diagram of an implementation of a companion device 1450 according to some embodiments. Companion device 1450 includes a processing subsystem 1452, storage subsystem 1454, a user input device 1456, a user output device 1458, a network interface 1460, and a location/motion detector 1462. Network interface 1460 can have similar or identical features as network interface 1410 of device 1400 described above. In some embodiments, companion device 1450 can be an Apple iPhone.

Processing subsystem 1452, which can be implemented as one or more integrated circuits (e.g., a conventional microprocessor or microcontroller), can control the operation of companion device 1450. In various embodiments, processing subsystem 1452 can execute a variety of programs in response to program code and can maintain multiple concurrently executing programs or processes. At any given time, some or all of the program code to be executed can be resident in processing subsystem 1452 and/or in storage subsystem 1454.

Through suitable programming, processing subsystem 1452 can provide various functionality for companion device 1450. Thus, companion device 1450 can interact with device 1400 in order to send wireless signals and/or data transmissions to device 1400. In one embodiment, companion device 1450 device emits wireless signals (e.g., Bluetooth signals) that accessory device 1400 can detect and to which accessory device 1400 can respond.

Storage subsystem 1454 can be implemented, e.g., using disk, flash memory, or any other storage media in any combination, and can include volatile and/or non-volatile storage as desired. In some embodiments, storage subsystem 1454 can store one or more application programs to be executed by processing subsystem 1452. In some embodiments, storage subsystem 1454 can store program code update data 1466. Programs and/or data can be stored in non-volatile storage and copied in whole or in part to volatile working memory during program execution.

A user interface can be provided by one or more user input devices 1456 and one or more user output devices 1458. User input and output devices 1456 and 1458 can be similar or identical to user input and output devices 1406 and 1408 of device 1400 described above. In some instances, user input and output devices 1456 and 1458 are configured to allow a programmer to interact with companion device 1450.

It will be appreciated that accessory device 1400 and companion device 1450 described herein are illustrative and that variations and modifications are possible. A device can be implemented as a mobile electronic device and can have other capabilities not specifically described herein (e.g., telephonic capabilities, power management, accessory connectivity, etc.). In a system with multiple accessory devices 1400 and/or multiple companion devices 1450, different accessory devices 1400 and/or companion devices 1450 can have different sets of capabilities; the various accessory devices 1400 and/or companion devices 1450 can be but need not be similar or identical to each other.

Further, while accessory device 1400 and companion device 1450 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Various embodiments described herein can be realized in a variety of apparatus including electronic devices implemented using any combination of circuitry and software.

Additionally, while accessory device 1400 and companion device 1450 are described as singular entities, it is to be understood that each can include multiple coupled entities.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments described herein can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments described herein using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to some embodiments may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments described herein. However, other embodiments may be directed to specific embodiments relating to each individual aspect, or specific combinations of these individual aspects The above description of exemplary embodiments has been presented for the purposes of illustration and description. It is not intended to be exhaustive or to limit any invention to the precise form described, and many modifications and variations are possible in light of the teaching above. The embodiments were chosen and described in order to best explain the principles of inventions and their practical applications to thereby enable others skilled in the art to best utilize these inventions in various embodiments and with various modifications as are suited to the particular use contemplated.

What is claimed is:

1. A method of managing communications of a first device with a second device, the method comprising, at the first device:
    establishing a first connection with the second device;
    receiving, from a first client application on the first device, a first message to be sent to the second device using a first communication service on the first device, the first communication service being software executing on the first device;
    prior to sending the first message to the second device, determining a first compatibility version of the first communication service based on configuration data for the first communication service;
    determining, prior to sending the first message, a second compatibility version for a second communication service on the second device based on a configuration data for the second communication service, the second communication service being software executing on the second device;
    comparing the first compatibility version of the first communication service to the second compatibility version of the second communication service for the second device to determine whether the first communication service on the first device is compatible with the second communication service on the second device; and
    in response to determining that the first communication service on the first device is compatible with the second communication service on the second device, sending the first message to the second device.

2. The method of claim 1, further comprising, at the first device:
    receiving, from a second client application on the first device, a second message to be sent using a third communication service on the first device;
    determining, prior to sending the second message, a third compatibility version of the third communication service based on configuration data for the third communication service, the third communication service being software executing on the first device;
    comparing the third compatibility version of the third communication service to the second compatibility version for the second device to determine whether the third communication service on the first device is compatible with the second communication service on the second device; and
    in response to determining that the third communication service on the first device is compatible with the second communication service on the second device, sending the second message to the second device.

3. The method of claim 1, further comprising, at the first device:
    establishing a second connection with a third device;
    determining a third compatibility version for a third communication service on the third device based on configuration data for the third communication service, wherein the first message is to be sent to the second device and the third device, the third communication service being software executing on the third device;
    comparing the first compatibility version of the first communication service to the third compatibility version for the third device to determine whether the first communication service on the first device is compatible with the third communication service on the third device; and
    in response to determining that the first communication service on the first device is compatible with the third communication service on the third device, sending the first message to the third device.

4. The method of claim 3, further comprising, at the first device:
    sending a success message to the first client application when the first message is sent to at least one of the second device and the third device.

5. The method of claim 1, wherein the first message is received at a transport layer that determines whether the first communication service on the first device is compatible with the second communication service on the second device.

6. The method of claim 1, further comprising, at the first device:
    receiving, from the first client application on the first device, a second message to be sent using a third communication service;
    determining, prior to sending the second message, a third compatibility version of the third communication service based on configuration data for the third communication service, the third communication service being software executing on the first device;

comparing the third compatibility version of the third communication service to the second compatibility version for the second device to determine whether the third communication service on the first device is compatible with the second communication service on the second device; and in response to determining that the third communication service on the first device is compatible with the second communication service on the second device, sending the second message to the second device.

7. The method of claim 1, wherein the first message is received at a service framework that determines whether the first communication service on the first device is compatible with the second communication service on the second device, and wherein the service framework sends the first message to a transport layer for sending to the second device.

8. The method of claim 1, wherein determining the second compatibility version includes:
obtaining the second compatibility version from the second device;
storing the second compatibility version in association with connection information for the second device; and
retrieving the second compatibility version in response to receiving the first message.

9. A non-transitory computer-readable storage memory storing instructions which, when executed by one or more processors of a first device, cause the one or more processors to perform operations comprising:
establishing a first connection with a second device;
receiving, from a first client application on the first device, a first message to be sent to the second device using a first communication service on the first device, the first communication service being software executing on the first device, the first communication service being software executing on the first device;
determining, prior to sending the first message, a first compatibility version of the first communication service based on configuration data for the first communication service;
determining, prior to sending the first message, a second compatibility version for a second communication service on the second device based on configuration data for the second communication, the second communication service being software executing on the second device;
comparing the first compatibility version of the first communication service to the second compatibility version for the second device to determine whether the first communication service on the first device is compatible with the second communication service on the second device; and
in response to determining that the first communication service on the first device is compatible with the second communication service on the second device, sending the first message to the second device.

10. The non-transitory computer-readable storage memory of claim 9, wherein the operations further comprise:
receiving, from a second client application on the first device, a second message to be sent using a third communication service on the first device;
determining, prior to sending the second message, a third compatibility version of the third communication service based on configuration data for the third communication service, the third communication service being software executing on the first device;

comparing the third compatibility version of the third communication service to the second compatibility version for the second device to determine whether the third communication service on the first device is compatible with the second communication service on the second device; and in response to determining that the third communication service on the first device is compatible with the second communication service on the second device, sending the second message to the second device.

11. The non-transitory computer-readable storage memory of claim 9, wherein the operations further comprise:
establishing a second connection with a third device;
determining a third compatibility version for a third communication service on the third device based on configuration data for the third communication service, wherein the first message is to be sent to the second device and the third device, the third communication service being software executing on the third device
comparing the first compatibility version of the first communication service to the third compatibility version for the third device to determine whether the first communication service on the first device is compatible with the third communication service on the third device; and
in response to determining that the first communication service on the first device is compatible with the third communication service on the third device, sending the first message to the third device.

12. The non-transitory computer-readable storage memory of claim 9, wherein the operations further comprise:
receiving, from the first client application on the first device, a second message to be sent using a third communication service;
determining, prior to sending the second message, a third compatibility version of the third communication service based on configuration data for the third communication service, the third communication service being software executing on the first device;
comparing the third compatibility version of the third communication service to the second compatibility version for the second device to determine whether the third communication service on the first device is compatible with the second communication service on the second device; and
in response to determining that the third communication service on the first device is compatible with the second communication service on the second device, sending the second message to the second device.

13. The non-transitory computer-readable storage memory of claim 9, wherein determining the second compatibility version includes:
obtaining the second compatibility version from the second device;
storing the second compatibility version in association with connection information for the second device; and
retrieving the second compatibility version in response to receiving the first message.

14. The non-transitory computer-readable storage memory of claim 9, wherein the first message is received at a transport layer that determines whether the first communication service on the first device is compatible with the second communication service on the second device.

15. A first device comprising:
one or more processors configured to:
   establish a first connection with a second device;
   receive, from a first client application on the first device, a first message to be sent to the second device using a first communication service on the first device;
   determine, prior to sending the first message, a first compatibility version of the first communication service based on configuration data for the first communication service, the first communication service being software executing on the first device;
   determine, prior to sending the first message, a second compatibility version for a second communication service on the second device based on configuration data for the second communication service, the second communication service being software executing on the second device;
   compare the first compatibility version of the first communication service to the second compatibility version for the second device to determine whether the first communication service on the first device is compatible with the second communication service on the second device; and
   in response to determining that the first communication service on the first device is compatible with the second communication service on the second device, send the first message to the second device.

16. The first device of claim 15, wherein the one or more processors are further configured to:
   receive, from a second client application on the first device, a second message to be sent using a third communication service on the first device;
   determine, prior to sending the second message, a third compatibility version of the third communication service based on configuration data for the third communication service, the third communication service being software executing on the first device;
   compare the third compatibility version of the third communication service to the second compatibility version for the second device to determine whether the third communication service on the first device is compatible with the second communication service on the second device; and
   in response to determining that the third communication service on the first device is compatible with the second communication service on the second device, send the second message to the second device.

17. The first device of claim 15, wherein the one or more processors are further configured to:
   establish a second connection with a third device;
   determine, prior to sending the first message, a third compatibility version for third communication service on the third device, wherein the first message is to be sent to the second device and the third device based on at least one configuration file or a query to a compatibility table for the third communication service, the third communication service being software executing on the third device;
   compare the first compatibility version of the first communication service to the third compatibility version for the third device to determine whether the first communication service on the first device is compatible with the third communication service on the third device; and
   in response to determining that the first communication service on the first device is compatible with the third communication service on the third device, send the first message to the third device.

18. The first device of claim 15, wherein the one or more processors are further configured to:
   receive, from the first client application on the first device, a second message to be sent using a third communication service;
   determine, prior to sending the second message, a third compatibility version of the third communication service based on configuration data for the third communication service, the third communication service being software executing on the first device;
   compare the third compatibility version of the third communication service to the second compatibility version for the second device to determine whether the third communication service on the first device is compatible with the second communication service on the second device; and
   in response to determining that the third communication service on the first device is compatible with the second communication service on the second device, send the second message to the second device.

19. The first device of claim 15, wherein the first message is received at a transport layer that determines whether the first communication service on the first device is compatible with the second communication service on the second device.

20. The first device of claim 15, wherein determining the second compatibility version includes:
   obtaining the second compatibility version from the second device;
   storing the second compatibility version in association with connection information for the second device; and
   retrieving the second compatibility version in response to receiving the first message.

21. The method of claim 1 wherein the configuration data corresponds to a configuration file or a query to a compatibility table.

22. The non-transitory computer-readable storage memory of claim 9 wherein the configuration data corresponds to a configuration file or a query to a compatibility table.

23. The first device of claim 15 wherein the configuration data corresponds to a configuration file or a query to a compatibility table.

* * * * *